US008843392B2

(12) United States Patent
Faber et al.

(10) Patent No.: US 8,843,392 B2
(45) Date of Patent: *Sep. 23, 2014

(54) APPARATUS AND METHOD FOR RECRUITING, COMMUNICATING WITH, AND PAYING PARTICIPANTS OF INTERACTIVE ADVERTISING

(71) Applicant: YP Interactive LLC, Wilmington, DE (US)

(72) Inventors: Scott Faber, San Francisco, CA (US); Sean Van Der Linden, Berkeley, CA (US); Patrick McKenna, San Francisco, CA (US); Peter Chen, Palo Alto, CA (US)

(73) Assignee: YP Interactive LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/866,838

(22) Filed: Apr. 19, 2013

(65) Prior Publication Data

US 2013/0311261 A1 Nov. 21, 2013

Related U.S. Application Data

(63) Continuation of application No. 10/956,571, filed on Oct. 1, 2004, now Pat. No. 8,468,050, which is a continuation of application No. 09/808,475, filed on Mar. 13, 2001, now abandoned.

(51) Int. Cl.
*G06Q 30/00* (2012.01)
*G06Q 30/02* (2012.01)

(52) U.S. Cl.
CPC ........ *G06Q 30/0215* (2013.01); *G06Q 30/0217* (2013.01); *G06Q 30/0273* (2013.01); *G06Q 30/0277* (2013.01); *G06Q 30/0261* (2013.01); *G06Q 30/02* (2013.01); *G06Q 30/0256* (2013.01); *G06Q 30/0267* (2013.01)
USPC ....................................................... 705/14.1

(58) Field of Classification Search
CPC .................................................. G06Q 90/00
USPC ........................................................ 705/14.1
See application file for complete search history.

(56) References Cited

U.S. PATENT DOCUMENTS 4,313,035 A 1/1982 Jordan et al.
4,577,065 A 3/1986 Frey et al.
(Continued)

FOREIGN PATENT DOCUMENTS

AU 699785 5/1995
EP 1489529 12/2004
(Continued)

OTHER PUBLICATIONS

De Lasser, Eleena, "When Business Plan and Real World Clash," Wall Street Journal, p. B1, Jun. 1999.
(Continued)

*Primary Examiner* — Daniel Lastra
(74) *Attorney, Agent, or Firm* — Greenberg Traurig LLP

(57) ABSTRACT

A method and apparatus for recruiting, communicating with, and paying participants of interactive advertising are described. The present invention is a system through which advertisers car recruit, communicate with, and pay their potential customers for their time. The system achieves these functions without the advertiser or the customer having to be in the same location—all logistics are handled through the system's web site, database, and communications interfaces. The system enables advertisers to promote interactive seminars in which they try to sell products to potential customers. Most importantly, the advertisers are able to offer their potential customers financial rewards for their time, such as 25 cents per minute to reward a customer for listening to a sales pitch. The system then provides a real-time communications link between the advertiser and customer. The system automatically bills the advertiser and rewards the customer for the time that they interact.

19 Claims, 11 Drawing Sheets

(56) References Cited

U.S. PATENT DOCUMENTS

| | | |
|---|---|---|
| 4,604,686 A | 8/1986 | Reiter et al. |
| 4,631,428 A | 12/1986 | Grimes |
| 4,645,873 A | 2/1987 | Chomet |
| 4,653,090 A | 3/1987 | Hayden |
| 4,677,434 A | 6/1987 | Fascenda |
| 4,677,659 A | 6/1987 | Dargan |
| 4,723,283 A | 2/1988 | Nagasawa et al. |
| 4,741,025 A | 4/1988 | Maruyama et al. |
| 4,751,669 A | 6/1988 | Sturgis et al. |
| 4,752,675 A | 6/1988 | Zetmeir |
| 4,757,267 A | 7/1988 | Riskin |
| 4,788,718 A | 11/1988 | McNabb et al. |
| 4,796,293 A | 1/1989 | Blinken et al. |
| 4,817,129 A | 3/1989 | Riskin |
| 4,847,890 A | 7/1989 | Solomon et al. |
| 4,850,007 A | 7/1989 | Marino et al. |
| 4,878,239 A | 10/1989 | Solomon et al. |
| 4,963,995 A | 10/1990 | Lang |
| 4,969,185 A | 11/1990 | Dorst et al. |
| 5,017,917 A | 5/1991 | Fisher et al. |
| 5,057,932 A | 10/1991 | Lang |
| 5,058,152 A | 10/1991 | Solomon et al. |
| 5,099,510 A | 3/1992 | Blinken, Jr. et al. |
| 5,148,474 A | 9/1992 | Haralambopoulos et al. |
| 5,155,743 A | 10/1992 | Jacobs |
| 5,155,761 A | 10/1992 | Hammond |
| 5,164,839 A | 11/1992 | Lang |
| 5,206,903 A | 4/1993 | Kohler et al. |
| 5,262,875 A | 11/1993 | Mincer et al. |
| 5,319,542 A | 6/1994 | King, Jr. et al. |
| 5,325,424 A | 6/1994 | Grube |
| 5,339,358 A | 8/1994 | Danish et al. |
| 5,347,632 A | 9/1994 | Filepp et al. |
| 5,359,508 A | 10/1994 | Rossides |
| 5,361,295 A | 11/1994 | Solomon et al. |
| 5,369,694 A | 11/1994 | Bales et al. |
| 5,373,549 A | 12/1994 | Bales et al. |
| 5,436,957 A | 7/1995 | McConnell |
| 5,440,334 A | 8/1995 | Walters et al. |
| 5,448,625 A | 9/1995 | Lederman |
| 5,453,352 A | 9/1995 | Tachibana |
| 5,459,779 A | 10/1995 | Backaus et al. |
| 5,469,497 A | 11/1995 | Pierce et al. |
| 5,483,352 A | 1/1996 | Fukuyama et al. |
| 5,483,588 A | 1/1996 | Eaton et al. |
| 5,497,502 A | 3/1996 | Castille |
| 5,524,146 A | 6/1996 | Morrisey et al. |
| 5,537,314 A | 7/1996 | Kanter |
| 5,539,735 A | 7/1996 | Moskowitz |
| 5,539,813 A | 7/1996 | Jonsson |
| 5,544,237 A | 8/1996 | Bales et al. |
| 5,555,298 A | 9/1996 | Jonsson |
| 5,557,677 A | 9/1996 | Prytz |
| 5,559,875 A | 9/1996 | Bieselin et al. |
| 5,574,780 A | 11/1996 | Andruska et al. |
| 5,574,781 A | 11/1996 | Blaze |
| 5,589,892 A | 12/1996 | Knee et al. |
| 5,590,197 A | 12/1996 | Chen et al. |
| 5,596,634 A | 1/1997 | Fernandez et al. |
| 5,602,905 A | 2/1997 | Mettke |
| 5,604,803 A | 2/1997 | Aziz |
| 5,608,786 A | 3/1997 | Gordon |
| 5,615,213 A | 3/1997 | Griefer |
| 5,619,148 A | 4/1997 | Guo |
| 5,619,555 A | 4/1997 | Fenton et al. |
| 5,619,570 A | 4/1997 | Tsutsui |
| 5,619,725 A | 4/1997 | Gordon |
| 5,619,991 A | 4/1997 | Sloane |
| 5,623,536 A | 4/1997 | Solomon et al. |
| 5,634,012 A | 5/1997 | Stefik et al. |
| 5,638,432 A | 6/1997 | Wille et al. |
| 5,644,715 A | 7/1997 | Baugher |
| 5,651,058 A | 7/1997 | Hackett-Jones et al. |
| 5,659,742 A | 8/1997 | Beattie et al. |
| 5,668,953 A | 9/1997 | Sloo |
| 5,675,734 A | 10/1997 | Hair |
| 5,689,553 A | 11/1997 | Ahuja et al. |
| 5,694,163 A | 12/1997 | Harrison |
| 5,694,537 A | 12/1997 | Montenegro et al. |
| 5,694,549 A | 12/1997 | Carlin et al. |
| 5,696,965 A | 12/1997 | Dedrick |
| 5,701,419 A | 12/1997 | McConnell |
| 5,710,887 A | 1/1998 | Chelliah et al. |
| 5,710,970 A | 1/1998 | Walters et al. |
| 5,712,979 A | 1/1998 | Graber et al. |
| 5,715,314 A | 2/1998 | Payne et al. |
| 5,717,860 A | 2/1998 | Graber et al. |
| 5,718,247 A | 2/1998 | Frankel |
| 5,721,763 A | 2/1998 | Joseph et al. |
| 5,722,418 A | 3/1998 | Bro |
| 5,724,424 A | 3/1998 | Gifford |
| 5,724,521 A | 3/1998 | Dedrick |
| 5,734,961 A | 3/1998 | Castille |
| 5,740,231 A | 4/1998 | Cohn et al. |
| 5,740,549 A | 4/1998 | Reilly et al. |
| 5,745,681 A | 4/1998 | Levine et al. |
| 5,751,956 A | 5/1998 | Kirsch |
| 5,768,348 A | 6/1998 | Solomon et al. |
| 5,768,521 A | 6/1998 | Dedrick |
| 5,774,534 A | 6/1998 | Mayer |
| 5,778,367 A | 7/1998 | Wesinger, Jr. et al. |
| 5,781,894 A | 7/1998 | Petrecca et al. |
| 5,793,851 A | 8/1998 | Albertson |
| 5,794,210 A | 8/1998 | Goldhaber et al. |
| 5,794,221 A | 8/1998 | Egendorf |
| 5,802,502 A | 9/1998 | Gell et al. |
| 5,809,119 A | 9/1998 | Tonomura et al. |
| 5,809,145 A | 9/1998 | Slik et al. |
| 5,812,769 A | 9/1998 | Graber et al. |
| 5,818,836 A | 10/1998 | DuVal |
| 5,819,092 A | 10/1998 | Ferguson et al. |
| 5,819,267 A | 10/1998 | Uyama |
| 5,819,271 A | 10/1998 | Mahoney et al. |
| 5,819,285 A | 10/1998 | Damico et al. |
| 5,825,869 A | 10/1998 | Brooks et al. |
| 5,825,876 A | 10/1998 | Peterson, Jr. |
| 5,832,523 A | 11/1998 | Kanai et al. |
| 5,835,896 A | 11/1998 | Fisher et al. |
| 5,841,763 A | 11/1998 | Leondires et al. |
| 5,842,212 A | 11/1998 | Ballurio et al. |
| 5,845,265 A | 12/1998 | Woolston |
| 5,850,433 A | 12/1998 | Rondeau |
| 5,860,068 A | 1/1999 | Cook |
| 5,862,223 A | 1/1999 | Walker et al. |
| 5,864,871 A | 1/1999 | Kitain et al. |
| RE36,111 E | 2/1999 | Neville |
| 5,870,546 A | 2/1999 | Kirsch |
| 5,870,744 A | 2/1999 | Sprague |
| 5,878,130 A | 3/1999 | Andrews et al. |
| 5,884,032 A | 3/1999 | Bateman et al. |
| 5,884,272 A | 3/1999 | Walker et al. |
| 5,884,282 A | 3/1999 | Robinson |
| 5,889,774 A | 3/1999 | Mirashrafi et al. |
| 5,890,138 A | 3/1999 | Godin et al. |
| 5,893,077 A | 4/1999 | Griffin |
| 5,901,214 A | 5/1999 | Shaffer et al. |
| 5,903,635 A | 5/1999 | Kaplan |
| 5,903,877 A | 5/1999 | Berkowitz et al. |
| 5,907,677 A | 5/1999 | Glenn et al. |
| 5,911,132 A | 6/1999 | Sloane |
| 5,914,951 A | 6/1999 | Bentley et al. |
| 5,915,214 A | 6/1999 | Reece et al. |
| 5,924,082 A | 7/1999 | Silverman et al. |
| 5,937,390 A | 8/1999 | Hyodo |
| 5,940,471 A | 8/1999 | Homayoun |
| 5,940,484 A | 8/1999 | DeFazio et al. |
| 5,943,416 A | 8/1999 | Gisby |
| 5,943,422 A | 8/1999 | Van Wie et al. |
| 5,946,646 A | 8/1999 | Schena et al. |
| 5,948,054 A | 9/1999 | Nielsen |
| 5,960,416 A | 9/1999 | Block |
| 5,963,202 A | 10/1999 | Polish |
| 5,963,861 A | 10/1999 | Hanson |
| 5,974,141 A | 10/1999 | Saito |

(56) References Cited

U.S. PATENT DOCUMENTS

| | | |
|---|---|---|
| 5,974,398 A | 10/1999 | Hanson et al. |
| 5,978,567 A | 11/1999 | Rebane et al. |
| 5,982,863 A | 11/1999 | Smiley et al. |
| 5,987,102 A | 11/1999 | Elliott et al. |
| 5,987,118 A | 11/1999 | Dickerman et al. |
| 5,987,430 A | 11/1999 | Van Horne et al. |
| 5,991,394 A | 11/1999 | Dezonno et al. |
| 5,995,705 A | 11/1999 | Lang |
| 5,999,609 A | 12/1999 | Nishimura |
| 5,999,611 A | 12/1999 | Tatchell et al. |
| 5,999,965 A | 12/1999 | Kelly |
| 6,006,197 A | 12/1999 | D'Eon et al. |
| 6,011,794 A | 1/2000 | Mordowitz et al. |
| 6,014,439 A | 1/2000 | Walker et al. |
| 6,014,644 A | 1/2000 | Erickson |
| 6,016,478 A | 1/2000 | Zhang et al. |
| 6,026,087 A | 2/2000 | Mirashrafi et al. |
| 6,026,148 A | 2/2000 | Dworkin et al. |
| 6,026,375 A | 2/2000 | Hall et al. |
| 6,026,400 A | 2/2000 | Suzuki |
| 6,028,601 A | 2/2000 | Machiraju et al. |
| 6,029,141 A | 2/2000 | Bezos et al. |
| 6,035,021 A | 3/2000 | Katz |
| 6,046,762 A | 4/2000 | Sonesh et al. |
| 6,055,513 A | 4/2000 | Katz et al. |
| 6,058,379 A | 5/2000 | Odom et al. |
| 6,064,978 A | 5/2000 | Gardner et al. |
| 6,067,561 A | 5/2000 | Dillon |
| 6,078,866 A | 6/2000 | Buck et al. |
| 6,108,493 A | 8/2000 | Miller et al. |
| 6,108,704 A | 8/2000 | Hutton et al. |
| 6,130,933 A | 10/2000 | Miloslavsky |
| 6,131,085 A | 10/2000 | Rossides |
| 6,144,670 A | 11/2000 | Sponaugle et al. |
| 6,167,379 A | 12/2000 | Dean et al. |
| 6,167,449 A | 12/2000 | Arnold et al. |
| 6,173,279 B1 | 1/2001 | Levin et al. |
| 6,175,619 B1 | 1/2001 | DeSimone |
| 6,185,194 B1 | 2/2001 | Musk et al. |
| 6,185,289 B1 | 2/2001 | Hetz et al. |
| 6,188,673 B1 | 2/2001 | Bauer et al. |
| 6,188,761 B1 | 2/2001 | Dickerman et al. |
| 6,189,030 B1 | 2/2001 | Kirsch et al. |
| 6,192,050 B1 | 2/2001 | Stovall |
| 6,199,096 B1 | 3/2001 | Mirashrafi et al. |
| 6,208,713 B1 | 3/2001 | Rahrer et al. |
| 6,212,192 B1 | 4/2001 | Mirashrafi et al. |
| 6,212,268 B1 | 4/2001 | Nielsen |
| 6,216,111 B1 | 4/2001 | Walker et al. |
| 6,223,165 B1 | 4/2001 | Lauffer |
| 6,230,287 B1 | 5/2001 | Pinard et al. |
| 6,233,566 B1 | 5/2001 | Levine et al. |
| 6,243,684 B1 | 6/2001 | Stuart et al. |
| 6,246,875 B1 | 6/2001 | Seazholtz et al. |
| 6,248,946 B1 | 6/2001 | Dwek |
| 6,259,774 B1 | 7/2001 | Miloskavsky |
| 6,266,651 B1 | 7/2001 | Woolston |
| 6,269,336 B1 | 7/2001 | Ladd et al. |
| 6,269,361 B1 | 7/2001 | Davis et al. |
| 6,275,490 B1 | 8/2001 | Mattaway et al. |
| 6,282,515 B1 | 8/2001 | Speicher |
| 6,292,799 B1 | 9/2001 | Peek et al. |
| 6,298,056 B1 | 10/2001 | Pendse |
| 6,301,342 B1 | 10/2001 | Ander et al. |
| 6,301,350 B1 | 10/2001 | Henningson et al. |
| 6,304,637 B1 | 10/2001 | Mirashrafi et al. |
| 6,310,941 B1 | 10/2001 | Crutcher et al. |
| 6,311,231 B1 | 10/2001 | Bateman et al. |
| 6,314,402 B1 | 11/2001 | Monaco et al. |
| 6,314,454 B1 | 11/2001 | Wang et al. |
| 6,323,894 B1 | 11/2001 | Katz |
| 6,327,572 B1 | 12/2001 | Morton et al. |
| 6,353,663 B1 | 3/2002 | Stevens et al. |
| 6,381,325 B1 | 4/2002 | Hanson |
| 6,385,583 B1 | 5/2002 | Ladd et al. |
| 6,389,278 B1 | 5/2002 | Singh |
| 6,389,541 B1 | 5/2002 | Patterson |
| 6,393,117 B1 | 5/2002 | Trell |
| 6,393,412 B1 | 5/2002 | Deep |
| 6,400,806 B1 | 6/2002 | Uppaluru |
| 6,404,864 B1 | 6/2002 | Evslin et al. |
| 6,404,877 B1 | 6/2002 | Bolduc et al. |
| 6,404,884 B1 | 6/2002 | Marwell et al. |
| 6,408,278 B1 | 6/2002 | Carney et al. |
| 6,418,214 B1 | 7/2002 | Smythe et al. |
| 6,430,276 B1 | 8/2002 | Bouvier et al. |
| 6,434,527 B1 | 8/2002 | Horvitz |
| 6,460,036 B1 | 10/2002 | Herz |
| 6,461,162 B1 | 10/2002 | Reitman et al. |
| 6,463,136 B1 | 10/2002 | Malik |
| 6,466,966 B1 | 10/2002 | Kirsch et al. |
| 6,470,079 B1 | 10/2002 | Benson |
| 6,470,181 B1 | 10/2002 | Maxwell |
| 6,470,317 B1 | 10/2002 | Ladd et al. |
| 6,470,338 B1 | 10/2002 | Rizzo et al. |
| 6,477,246 B1 | 11/2002 | Dolan et al. |
| 6,482,156 B2 | 11/2002 | Iliff |
| 6,484,148 B1 | 11/2002 | Boyd |
| 6,493,437 B1 | 12/2002 | Olshansky |
| 6,493,671 B1 | 12/2002 | Ladd et al. |
| 6,493,673 B1 | 12/2002 | Ladd et al. |
| 6,504,920 B1 | 1/2003 | Okon et al. |
| 6,510,417 B1 | 1/2003 | Woods et al. |
| 6,510,434 B1 | 1/2003 | Anderson et al. |
| 6,513,013 B1 | 1/2003 | Stephanou |
| 6,516,057 B2 | 2/2003 | Meek et al. |
| 6,519,570 B1 | 2/2003 | Faber et al. |
| 6,523,010 B2 | 2/2003 | Lauffer |
| 6,529,878 B2 | 3/2003 | De Rafael et al. |
| 6,529,946 B2 | 3/2003 | Yokono et al. |
| 6,535,506 B1 | 3/2003 | Narain et al. |
| 6,539,359 B1 | 3/2003 | Ladd et al. |
| 6,542,732 B1 | 4/2003 | Khazaka et al. |
| 6,546,372 B2 | 4/2003 | Lauffer |
| 6,549,889 B2 | 4/2003 | Lauffer |
| 6,560,576 B1 | 5/2003 | Cohen et al. |
| 6,563,915 B1 | 5/2003 | Salimando |
| 6,570,870 B1 | 5/2003 | Berstis |
| 6,606,376 B1 | 8/2003 | Trell |
| 6,609,106 B1 | 8/2003 | Robertson |
| 6,611,501 B1 | 8/2003 | Owen et al. |
| 6,625,595 B1 | 9/2003 | Anderson et al. |
| 6,628,760 B2 | 9/2003 | Mirashrafi et al. |
| 6,636,590 B1 | 10/2003 | Jacob et al. |
| 6,658,389 B1 | 12/2003 | Alpdemir |
| 6,668,286 B2 | 12/2003 | Bateman et al. |
| 6,691,093 B2 | 2/2004 | Shell |
| 6,704,403 B2 | 3/2004 | Lurie et al. |
| 6,731,625 B1 | 5/2004 | Eastep et al. |
| 6,731,736 B2 | 5/2004 | Meek et al. |
| 6,732,183 B1 | 5/2004 | Graham |
| 6,735,588 B2 | 5/2004 | Kim et al. |
| 6,741,691 B1 | 5/2004 | Ritter et al. |
| 6,757,364 B2 | 6/2004 | Newkirk |
| 6,760,537 B2 | 7/2004 | Mankovitz |
| 6,769,020 B2 | 7/2004 | Miyazaki et al. |
| 6,770,029 B2 | 8/2004 | Iliff |
| 6,771,640 B2 | 8/2004 | Karamchedu et al. |
| 6,771,760 B1 | 8/2004 | Vortman et al. |
| 6,775,359 B1 | 8/2004 | Ron et al. |
| 6,778,652 B2 | 8/2004 | Gaus et al. |
| 6,798,753 B2 | 9/2004 | Doganata et al. |
| 6,801,899 B2 | 10/2004 | Lauffer |
| 6,807,532 B1 | 10/2004 | Kolls |
| 6,807,571 B2 | 10/2004 | Hatano et al. |
| 6,813,346 B2 | 11/2004 | Gruchala et al. |
| 6,836,225 B2 | 12/2004 | Lee et al. |
| 6,839,737 B1 | 1/2005 | Friskel |
| 6,847,992 B1 | 1/2005 | Haitsuka et al. |
| 6,849,045 B2 | 2/2005 | Iliff |
| 6,850,965 B2 | 2/2005 | Allen |
| 6,856,809 B2 | 2/2005 | Fostick |
| 6,859,833 B2 | 2/2005 | Kirsch et al. |
| 6,865,540 B1 | 3/2005 | Faber et al. |

(56) References Cited

U.S. PATENT DOCUMENTS

| | | | |
|---|---|---|---|
| 6,898,435 | B2 | 5/2005 | Milman |
| 6,910,035 | B2 | 6/2005 | Hoekman et al. |
| 6,910,159 | B2 | 6/2005 | Phillips et al. |
| 6,937,699 | B1 | 8/2005 | Schuster et al. |
| 6,968,174 | B1 | 11/2005 | Trandal et al. |
| 6,990,183 | B2 | 1/2006 | Holland et al. |
| 6,993,326 | B2 | 1/2006 | Link, II et al. |
| 6,999,478 | B2 | 2/2006 | D'Angelo |
| 7,013,280 | B2 | 3/2006 | Davis et al. |
| 7,028,012 | B2 | 4/2006 | St. Vrain |
| 7,031,697 | B2 | 4/2006 | Yang et al. |
| 7,032,030 | B1 | 4/2006 | Condignotto |
| 7,035,381 | B2 | 4/2006 | D'Ascenzo et al. |
| 7,035,468 | B2 | 4/2006 | Yogeshwar et al. |
| 7,035,634 | B2 | 4/2006 | Mead et al. |
| 7,046,782 | B2 | 5/2006 | Miller |
| 7,076,037 | B1 | 7/2006 | Gonen et al. |
| 7,092,901 | B2 | 8/2006 | Davis et al. |
| 7,099,306 | B2 | 8/2006 | Goodman et al. |
| 7,103,010 | B2 | 9/2006 | Melideo |
| 7,120,235 | B2 | 10/2006 | Altberg et al. |
| 7,181,415 | B2 | 2/2007 | Blaser et al. |
| 7,187,761 | B2 | 3/2007 | Bookstaff |
| 7,200,413 | B2 | 4/2007 | Montemer |
| 7,212,615 | B2 | 5/2007 | Wolmuth |
| 7,224,781 | B2 | 5/2007 | Jacob et al. |
| 7,227,936 | B2 | 6/2007 | Bookstaff |
| 7,231,405 | B2 | 6/2007 | Xia |
| 7,240,110 | B2 | 7/2007 | Haitsuka et al. |
| 7,240,290 | B2 | 7/2007 | Melideo |
| 7,249,045 | B2 | 7/2007 | Lauffer |
| 7,289,612 | B2 | 10/2007 | Lurie et al. |
| 7,289,623 | B2 | 10/2007 | Lurie |
| 7,297,108 | B2 | 11/2007 | Iliff |
| 7,297,111 | B2 | 11/2007 | Iliff |
| 7,300,402 | B2 | 11/2007 | Iliff |
| 7,306,560 | B2 | 12/2007 | Iliff |
| 7,315,837 | B2 | 1/2008 | Sloan et al. |
| 7,359,498 | B2 | 4/2008 | Faber et al. |
| 7,363,254 | B2 | 4/2008 | Skinner |
| 7,366,683 | B2 | 4/2008 | Altberg et al. |
| 7,380,139 | B2 | 5/2008 | Tagawa et al. |
| 7,401,053 | B2 | 7/2008 | Kamimura et al. |
| 7,412,043 | B2 | 8/2008 | Horvath et al. |
| 7,428,497 | B2 | 9/2008 | Agarwal et al. |
| 7,433,459 | B2 | 10/2008 | Reding |
| 7,434,169 | B2 | 10/2008 | Quillen et al. |
| 7,434,175 | B2 | 10/2008 | Melideo |
| 7,453,998 | B2 | 11/2008 | Jacob et al. |
| 7,464,045 | B2 | 12/2008 | McSherry |
| 7,475,149 | B2 | 1/2009 | Jacob |
| 7,496,357 | B2 | 2/2009 | Dunn et al. |
| 7,876,886 | B2 | 1/2011 | Altberg et al. |
| 7,995,723 | B2 | 8/2011 | Jacob et al. |
| 8,027,878 | B2 | 9/2011 | Wong et al. |
| 8,468,050 | B2 * | 6/2013 | Faber et al. ............... 705/14.1 |
| 2001/0012913 | A1 | 8/2001 | Iliff |
| 2001/0025274 | A1 | 9/2001 | Zehr et al. |
| 2001/0026609 | A1 | 10/2001 | Weinstein et al. |
| 2001/0027481 | A1 | 10/2001 | Whyel |
| 2001/0029482 | A1 | 10/2001 | Tealdi et al. |
| 2001/0032247 | A1 | 10/2001 | Kanaya |
| 2001/0037283 | A1 | 11/2001 | Mullaney |
| 2001/0044751 | A1 | 11/2001 | Pugliese et al. |
| 2001/0048737 | A1 | 12/2001 | Goldberg et al. |
| 2002/0003867 | A1 | 1/2002 | Rothschild et al. |
| 2002/0010608 | A1 | 1/2002 | Faber et al. |
| 2002/0010616 | A1 | 1/2002 | Itzhaki |
| 2002/0024948 | A1 | 2/2002 | Pendse |
| 2002/0026457 | A1 | 2/2002 | Jensen |
| 2002/0038233 | A1 | 3/2002 | Shubov et al. |
| 2002/0038293 | A1 | 3/2002 | Seiden |
| 2002/0057776 | A1 | 5/2002 | Dyer |
| 2002/0059082 | A1 | 5/2002 | Moczygemba |
| 2002/0069105 | A1 | 6/2002 | do Rosario Botelho et al. |
| 2002/0071423 | A1 | 6/2002 | Mirashrafi et al. |
| 2002/0072974 | A1 | 6/2002 | Pugliese et al. |
| 2002/0073207 | A1 | 6/2002 | Widger et al. |
| 2002/0095331 | A1 | 7/2002 | Osman et al. |
| 2002/0095359 | A1 | 7/2002 | Mangetsu |
| 2002/0107697 | A1 | 8/2002 | Jensen |
| 2002/0112005 | A1 | 8/2002 | Namias |
| 2002/0116256 | A1 | 8/2002 | De Rafael et al. |
| 2002/0116266 | A1 | 8/2002 | Marshall |
| 2002/0120554 | A1 | 8/2002 | Vega |
| 2002/0122547 | A1 | 9/2002 | Hinchey et al. |
| 2002/0133402 | A1 | 9/2002 | Faber et al. |
| 2002/0169836 | A1 | 11/2002 | Hood et al. |
| 2002/0191762 | A1 | 12/2002 | Benson |
| 2002/0193094 | A1 | 12/2002 | Lawless et al. |
| 2002/0193135 | A1 | 12/2002 | Nakano |
| 2003/0005126 | A1 | 1/2003 | Schwartz et al. |
| 2003/0026397 | A1 | 2/2003 | McCroskey |
| 2003/0041255 | A1 | 2/2003 | Chen et al. |
| 2003/0046161 | A1 | 3/2003 | Kamanger et al. |
| 2003/0046198 | A1 | 3/2003 | Knapp et al. |
| 2003/0061094 | A1 | 3/2003 | Banerjee et al. |
| 2003/0083042 | A1 | 5/2003 | Abuhamdeh |
| 2003/0105824 | A1 | 6/2003 | Brechner et al. |
| 2003/0112944 | A1 | 6/2003 | Brown et al. |
| 2003/0115089 | A1 | 6/2003 | Lurie |
| 2003/0126205 | A1 | 7/2003 | Lurie |
| 2003/0195787 | A1 | 10/2003 | Brunk et al. |
| 2003/0212600 | A1 | 11/2003 | Hood et al. |
| 2003/0220866 | A1 | 11/2003 | Pisaris-Henderson |
| 2003/0223565 | A1 | 12/2003 | Montemer |
| 2003/0225682 | A1 | 12/2003 | Montemer |
| 2003/0231754 | A1 | 12/2003 | Stein et al. |
| 2004/0003041 | A1 | 1/2004 | Moore et al. |
| 2004/0006511 | A1 | 1/2004 | Montemer |
| 2004/0010518 | A1 | 1/2004 | Montemer |
| 2004/0076403 | A1 | 4/2004 | Mankovitz |
| 2004/0083133 | A1 | 4/2004 | Nicholas et al. |
| 2004/0103024 | A1 | 5/2004 | Patel et al. |
| 2004/0162757 | A1 | 8/2004 | Pisaris-Henderson |
| 2004/0174965 | A1 | 9/2004 | Brahm et al. |
| 2004/0174974 | A1 | 9/2004 | Meek et al. |
| 2004/0193488 | A1 | 9/2004 | Khoo et al. |
| 2004/0193740 | A1 | 9/2004 | Kasmirsky et al. |
| 2004/0196833 | A1 | 10/2004 | Dahan et al. |
| 2004/0199494 | A1 | 10/2004 | Bhatt |
| 2004/0234049 | A1 | 11/2004 | Melideo |
| 2004/0235524 | A1 | 11/2004 | Abuhamdeh |
| 2004/0247092 | A1 | 12/2004 | Timmins et al. |
| 2004/0249649 | A1 | 12/2004 | Stratton et al. |
| 2004/0249778 | A1 | 12/2004 | Iliff |
| 2004/0254859 | A1 | 12/2004 | Aslanian |
| 2004/0260413 | A1 | 12/2004 | Melideo |
| 2005/0018829 | A1 | 1/2005 | Baker |
| 2005/0041647 | A1 | 2/2005 | Stinnie |
| 2005/0048961 | A1 | 3/2005 | Ribaudo et al. |
| 2005/0065811 | A1 | 3/2005 | Chu et al. |
| 2005/0071509 | A1 | 3/2005 | Faber et al. |
| 2005/0074100 | A1 | 4/2005 | Lederman |
| 2005/0074102 | A1 | 4/2005 | Altberg et al. |
| 2005/0076100 | A1 | 4/2005 | Armstrong |
| 2005/0080878 | A1 | 4/2005 | Cunningham et al. |
| 2005/0086104 | A1 | 4/2005 | McFadden |
| 2005/0096980 | A1 | 5/2005 | Koningstein |
| 2005/0100153 | A1 | 5/2005 | Pines et al. |
| 2005/0105881 | A1 | 5/2005 | Mankovitz |
| 2005/0114208 | A1 | 5/2005 | Arbuckle et al. |
| 2005/0114210 | A1 | 5/2005 | Faber et al. |
| 2005/0119957 | A1 | 6/2005 | Faber et al. |
| 2005/0125416 | A1 | 6/2005 | Kirsch et al. |
| 2005/0135387 | A1 | 6/2005 | Rychener et al. |
| 2005/0165666 | A1 | 7/2005 | Wong et al. |
| 2005/0203799 | A1 | 9/2005 | Faber et al. |
| 2005/0207432 | A1 | 9/2005 | Velez-Rivera et al. |
| 2005/0209874 | A1 | 9/2005 | Rossini |
| 2005/0216341 | A1 | 9/2005 | Agarwal et al. |
| 2005/0222908 | A1 | 10/2005 | Altberg et al. |
| 2005/0240432 | A1 | 10/2005 | Jensen |
| 2005/0245241 | A1 | 11/2005 | Durand et al. |

(56) References Cited

U.S. PATENT DOCUMENTS

| | | |
|---|---|---|
| 2005/0251445 A1 | 11/2005 | Wong et al. |
| 2005/0261964 A1 | 11/2005 | Fang |
| 2005/0286688 A1 | 12/2005 | Scherer |
| 2005/0289015 A1 | 12/2005 | Hunter et al. |
| 2006/0003735 A1 | 1/2006 | Trandal et al. |
| 2006/0004627 A1 | 1/2006 | Baluja |
| 2006/0031516 A1 | 2/2006 | Kumer |
| 2006/0069610 A1 | 3/2006 | Rossini |
| 2006/0075104 A1 | 4/2006 | Kumer |
| 2006/0095343 A1 | 5/2006 | Clarke et al. |
| 2006/0099936 A1 | 5/2006 | Link et al. |
| 2006/0106711 A1 | 5/2006 | Melideo |
| 2006/0136310 A1 | 6/2006 | Gonen et al. |
| 2006/0159063 A1 | 7/2006 | Kumar |
| 2006/0166655 A1 | 7/2006 | Montemer |
| 2006/0171520 A1 | 8/2006 | Kliger |
| 2006/0173827 A1 | 8/2006 | Kliger |
| 2006/0173915 A1 | 8/2006 | Kliger |
| 2006/0182250 A1 | 8/2006 | Melideo |
| 2006/0184378 A1 | 8/2006 | Agarwal et al. |
| 2006/0184417 A1 | 8/2006 | Van der Linden et al. |
| 2006/0200380 A1 | 9/2006 | Ho et al. |
| 2006/0247999 A1 | 11/2006 | Gonen et al. |
| 2006/0259365 A1 | 11/2006 | Agarwal et al. |
| 2006/0277108 A1 | 12/2006 | Altberg et al. |
| 2006/0277181 A1 | 12/2006 | Temple et al. |
| 2007/0011240 A1 | 1/2007 | Altberg et al. |
| 2007/0022011 A1 | 1/2007 | Altberg et al. |
| 2007/0038507 A1 | 2/2007 | Kumer |
| 2007/0067219 A1 | 3/2007 | Altberg et al. |
| 2007/0070980 A1 | 3/2007 | Phelps et al. |
| 2007/0078717 A1 | 4/2007 | Ho et al. |
| 2007/0081662 A1 | 4/2007 | Altberg et al. |
| 2007/0083408 A1 | 4/2007 | Altberg et al. |
| 2007/0100799 A1 | 5/2007 | Rose et al. |
| 2007/0100956 A1 | 5/2007 | Kumer |
| 2007/0116217 A1 | 5/2007 | Altberg et al. |
| 2007/0121844 A1 | 5/2007 | Altberg et al. |
| 2007/0121845 A1 | 5/2007 | Altberg et al. |
| 2007/0121846 A1 | 5/2007 | Altberg et al. |
| 2007/0121847 A1 | 5/2007 | Faber et al. |
| 2007/0121848 A1 | 5/2007 | Faber et al. |
| 2007/0124206 A1 | 5/2007 | Faber et al. |
| 2007/0124207 A1 | 5/2007 | Faber et al. |
| 2007/0127650 A1 | 6/2007 | Altberg et al. |
| 2007/0129054 A1 | 6/2007 | Andronikov et al. |
| 2007/0130014 A1 | 6/2007 | Altberg et al. |
| 2007/0140451 A1 | 6/2007 | Altberg et al. |
| 2007/0143182 A1 | 6/2007 | Faber et al. |
| 2007/0255622 A1 | 11/2007 | Swix et al. |
| 2007/0269038 A1 | 11/2007 | Gonen et al. |
| 2009/0060148 A1 | 3/2009 | Jacob et al. |

FOREIGN PATENT DOCUMENTS

| | | |
|---|---|---|
| GB | 2329046 | 3/1999 |
| JP | 09233441 | 9/1997 |
| JP | 09319812 | 12/1997 |
| JP | 2002007887 | 1/2002 |
| KR | 20010086595 | 9/2001 |
| WO | 9705733 | 2/1997 |
| WO | 9802835 | 1/1998 |
| WO | 9804061 | 1/1998 |
| WO | 9813765 | 4/1998 |
| WO | 9838558 | 9/1998 |
| WO | 9847295 | 10/1998 |
| WO | 9955066 | 10/1999 |
| WO | 0057326 | 9/2000 |
| WO | 0073960 | 12/2000 |
| WO | 0101217 | 1/2001 |
| WO | 0120518 | 3/2001 |
| WO | 0127825 | 4/2001 |
| WO | 0128141 | 4/2001 |
| WO | 0144973 | 6/2001 |
| WO | 0184415 | 11/2001 |
| WO | 0213110 | 2/2002 |
| WO | 0237470 | 5/2002 |
| WO | 0244870 | 6/2002 |
| WO | 2005040962 | 5/2005 |
| WO | 2005086980 | 9/2005 |
| WO | 2005101269 | 10/2005 |
| WO | 2005109287 | 11/2005 |
| WO | 2005109288 | 11/2005 |
| WO | 2005111887 | 11/2005 |
| WO | 2005111893 | 11/2005 |
| WO | 2006091966 | 8/2006 |
| WO | 2006091970 | 8/2006 |
| WO | 2007028173 | 3/2007 |
| WO | 2007038618 | 4/2007 |

OTHER PUBLICATIONS

Drescher, Bob et al., "Aspect Telecommunications Integrates the Web into the Call Center to Deliver New Level of Customer Service," Business Wire, Aug. 5, 1996.

Dyson, Esther, "Information, Bid and Asked," Forbes, p. 92, Aug. 20, 1990.

EK, Brian, "Walker Digital Issued Landmark U.S. Patent No. 5,862,223 for Global Internet Marketplace for Experts", Business Wire, Jan. 26, 1999.

Ellis, James E., "For Telesphere's Clients, Dial 1-900 TUF LUCK," Business Week, pp. 88-89, Sep. 9, 1991.

European Patent Office, Search Report for European Patent Application No. EP04253389.3, Sep. 17, 2004.

Green Digital Media, Inc., Big Green Blog: Jan. 2005 Archives, Jan. 28-31, 2005.

Greenblatt, Ellen, "Have You Ever Wondered . . . ," Datamation, p. 126, Oct. 1997.

Griffiths, J.W.R. et al., "Multimedia Communication in a Medical Environment," Singapore International Conference on Networks, pp. 166-171, Sep. 5, 1991.

Hase, Masahiko et al., "Advanced Videophone System Using Synchronized Video Filing Equipment," NTT Review, vol. 3, No. 4, pp. 29-36, Jul. 1991.

Healey, John, "From A-Z: You Can Sell Advice Online," San Jose Mercury News, retrieved from http://www.mercurycenter.com on Oct. 24, 2001.

Herman, Edith, "U.S. Courts to Launch First Federal 900 Service," Federal Computer Week, pp. 8, 10, Sep. 28, 1992.

Herzberg, Amir et al., "MiniPay: Charging Per Click on the Web," Computer Networks and ISDN Systems, vol. 29, pp. 939-951, Sep. 1997.

Hodgson, Cynthia, "Online Expert Databases & Services," Econtent, pp. 48-53, Dec. 1999.

Information Markets Corp., company information retrieved from http://www.infomarkets.com, available at least by Aug. 8, 2000.

Ingenio, Inc., "Keen: Your Personal Advisor," retrieved from http://www.keen.com, available at least by Feb. 4, 2006.

Ingenio, Inc., Press Archives for 2004, retrieved from http://www.ingenio.com on Feb. 21, 2006.

About Intellectexchange.com, Inc., company information retrieved from http://www.intellectexchange.com/About.asp, pp. 1-12, available at least by Aug. 8, 2000.

International Application No. PCT/US01/48284, International Search Report, May 13, 2002.

Jarvie, Barbara, "Company Devoted to Hot-Line Support," Computer Reseller News, p. 48, Oct. 21, 1991.

Kabeya, Kiyoshi et al., "A New Teleconsultation Terminal System Using ISDN," NTT Review, vol. 3, No. 4, pp. 37-43, Jul. 1991.

Kanellos, Michael, "Web Watch: Do You Want to Know the Meaning of Life?," Computer Reseller News, pp. 72-74, Mar. 3, 1997.

Keen.com, "Keen.com Launches First Live Answer Community, Connects People with Information to Share Over Their Standard Telephone," company press release, Nov. 8, 1999.

Keen.com, "The Most Popular U.S. Question and Answer Marketplace Goes International 90 Days After Launch," PR Newswire, Mar. 13, 2000.

(56) References Cited

OTHER PUBLICATIONS

Keen.com, company information retrieved from http://www.keen.com, available at least by 1999.
Kempner, Matt, "SWM Seeking—the Net Rather than Newspapers," Atlanta Journal the Atlanta Constitution, p. Q1, Sep. 10, 2000.
Kuehn, Richard A., "The Voice of Technology," Credit World, pp. 20-23, Jul. 1994.
Littleton, Linda, "HDD: A Helpdesk Database," Proceedings of the ACM SIGUCCS User Services Conference XXII, pp. 205-210, Oct. 16-19, 1994.
Ludwig, L.F. et al., "Laboratory for Emulation and Study of Integrated and Coordinated Media Communication, " Conference on Office Information Systems, pp. 283-291, Mar. 23-25, 1988.
Melideo, John, U.S. Appl. No. 60/471,535 entitled "HyperDial," filed May 19, 2003.
Menn, Joseph, "An Expert? There's Now a Home for You on the Internet," Los Angeles Times, retrieved from http://www.denverpost.com on Oct. 24, 2001.
Mercalli, Franco et al., "The ESSAI Teleshopping System: An Example of a Broadband Multimedia Application," IEEE Global Telecommunications Conference, pp. 572-576, Nov. 28, 1994.
Moore, Michael et al., "USA Global Link Brings Interactively to Internet Shopping," Business Wire, Oct. 7, 1998.
Ott, Chris, "Making Good on the Information Economy," Denver Business Journal, vol. 51, No. 17, p. 27A, Dec. 17, 1999.
Pelline, Jeff, "Net Firm to Connect Users by Phone," CNET News.com, Nov. 8, 1999.
Qcircuit.com, company information retrieved from http://www.qcircuit.com, available at least by Aug. 8, 2000.
Reding, Craig et al., U.S. Appl. No. 09/596,466 entitled "Methods and Apparatus for Providing Telephone Support for Internet Sales," filed Jun. 19, 2000.
Robinson, John, "Attachmate Ready to Answer Net Questions," Network World, p. 37, Apr. 8, 1996.
Rogers, Michael et al., "Experts Abound at New Web Sites," Library Journal, pp. 22-24, Mar. 1, 2000.
Sairamesh, Jakka et al., "NetBazaar: Networked Electronic Markets for Trading Computation and Information Services," Second European Conference on Research and Advanced Technology for Digital Libraries, pp. 839-856, Sep. 21, 1998.
Tehrani, Rich, "e-Rip Van Winkle and the 60-second Nap," Call Center Solutions, vol. 18, No. 2, pp. 16-18, Aug. 1999.
Telecommunications Buyers Guide and Directory, Editor & Publisher, pp. 29TC-38TC, Feb. 12, 1994.
Turco, Franco, "Legislation is Planned to Hem in 'Scooplines' Covers Revealing Rates, Blocking Service," Arizona Republic, Final Edition, Valley & State Section, p. B8, Jan. 16, 1988.
U.S. District Court, Southern District of New York, *Keen.com, Inc.* v. *InfoRocket.com, Inc.*, Preliminary Injunction Hearing, pp. 286-289, Jan. 8, 2002.
U.S. District Court, Southern District of New York, *Keen.com, Inc.* v. *InfoRocket.com, Inc.*: Complaint for Patent Infringement, Trade Dress Infringement and Unfair Competition; Demand for Jury Trial, Aug. 31, 2001.
Wagner, Mary, "Caring for Customers: Real-Time Text Chat and Telephony Provide Personalized Customer Support and Turn Queries into Sales Leads," Internet World Media, vol. 5, iss. 28, p. 30, Sep. 1, 1999.
Wood, Christina, "Hidden Cost of Tech Support," PC World, pp. 143-152, 156, May 1995.
"AtOnce Talks Up E-mail Marketing Campaigns with ITXC Push to Talk Service," Business Wire, Feb. 26, 2001.
"ITXC Corp and Doubleclick Energize Banner Ads with Web Telephony; Companies Voice-Enable Banner Advertisements Using ITXC Push to Talk Service," Business Wire, Dec. 12, 2000.
Ads-Click, "ADS-click Adds Skype-Based Pay-Per-Call Advertising Capabilities to Its Private-Labeled Solution, which will be Unveiled at ad:tech New York," Market Wire, Oct. 10, 2005.
Greenberg, Ken, "Jambo Launches to Connect People and Businesses from the Internet to the Phone," Market Wire, May 3, 2005.
Greenberg, Ken, "Jambo Names Netzero Co-founder Stacy Haitsuka to New Post of Chief Information Officer," Business Wire, Jul. 5, 2005.
Greenberg, Ken, "Jambo Receives $5 Million in Financing from Kline Hawkes & Co., Westlake Venture Partners, Others," Business Wire, Oct. 17, 2005.
Ingenio, Inc., "FindWhat.com Enters Agreement with Ingenio to Offer Pay Per Call Advertising Platform," press release available at http://www.ingenio.com, Apr. 7, 2004.
Jambo, "Welcome to Jambo—The Leader in Pay-Per-Call Solutions," company information retrieved from http://www.jambo.com, available at least by Oct. 17, 2005.
Jingle Networks, Inc., "1-800-FREE411 Provides Two Great Opportunities to Acquire New Customers," available at least by Oct. 20, 2005.
Jingle Networks, Inc., "Introducing 1-800 FREE411: First Nationwide Free Telephone Directory Assistance Service," Sep. 20, 2005.
"Applying Technology News," Accounting Technology, p. 14, Feb./Mar. 1997.
"TriNet's 'Help Me, I'm Stuck' Internet Voice Button Services Pushes Web Pages to Online Users," Business Wire, Mar. 25, 1998.
Allexperts.com, company information retrieved from http://www.allexperts.com, available at least by Apr. 9, 2000.
Answers.com, company information retrieved from http://www.answers.com, available at least by Aug. 8, 2000.
Dalton, Gregory, "Rent-An-Expert on the Web," Information Week, p. 75, Sep. 6, 1999.
Exp.com, Inc., company information retrieved from http://www.exp.com, available at least by Sep. 20, 2000.
Expertcity.com, "About Us," company information retrieved from http://www.expertcity.com, available at least by Apr. 9, 2000.
Experts Exchange, Inc., company information retrieved from http://www.experts-exchange.com, available at least by Apr. 9, 2000.
Sterling, Greg, "Ingenio's Ether—Pay Per Professional Advice," Search Engine Journal, Mar. 3, 2006.
University of Texas—Austin, information on the Electronic Emissary Project retrieved at www.tapr.org/emissary, available at least by Apr. 9, 2000.
Wasik, Joann M., "Information for Sale: Commercial Digital Reference and AskA Services," Virtual Reference Desk, http://www.vrd.org/AskA/commAskA.html, Sep. 20, 1999.
Wieland, Heidi et al., "Expertcity.com Launches Premier Online Marketplace for Expert Services," PR Newswire, Aug. 30, 1999.
International Application No. PCT/US04/15238, Written Opinion and International Search Report, Aug. 29, 2005.
International Application No. PCT/US05/12061, Written Opinion and International Search Report, Nov. 17, 2006.
"Connecting to On-Line Car Shoppers: Auto Sellers Use Netcall Internet Call-Button Technology to Turn 'Clicks' into Interactive Sales," Business Wire, p. 4089, Jul. 19, 1999.
"Keen.com raises $60 Million from Prestigious Investors and Strategic Partners Just 60 Days After Launch of Its Live Answer Community," Business Wire, Jan. 11, 2000.
"NetCall Internet Call Buttons Enhance E-Commerce Customer Service and Sales," PR Newswire, p. 7431, Aug. 9, 1999.
"Sell and Buy Advice Online," The Ottawa Citizen, p. D7, Nov. 29, 1999.
Addeo, E.J. et al., "An Experimental Multi-Media Bridging System," Frontiers in Computer Communications Technology, Computer Communications Review, vol. 17, No. 5, pp. 236-242, Aug. 11-13, 1987.
Alexander, Kelly King et al., "1-900 (Pay-For-Information Phone Services)," Baton Rouge Business Report, vol. 9, No. 20, pp. 23-27, Jul. 30, 1991.
Angelo, Simon, "SurfBrains.com: Brains Online Save Time & Money," M2 Presswire, Jul. 11, 2000.
Asthana, Abhaya et al., "A Small Domain Communications System for Personalized Shopping Assistance," IEEE International Conference on Personal Wireless Communications, Publication No. 0-7803-1996-6/94, pp. 199-203, Aug. 18, 1994.
Bazini, Liz, "UpSnap Selects LookSmart to Sell Premium Listings on FREE 411 Service for Text-Enabled Cell Phones," Nov. 4, 2004.

(56) References Cited

OTHER PUBLICATIONS

Becker, Ralph, "ISDN Tutorial: Interfaces," retrieved from http://www.ralphb.net/ISDN/ifaces.html, available at least by Apr. 21, 2000.

Becker, Ralph, "ISDN Tutorial: Definitions," retrieved from http://www.ralphb.net/ISDN/defs.html, available at least by Apr. 21, 2000.

Broad, Doug et al., "Lucent Technology and Netscape Team to Deliver Lucent Ecommerce Solutions," Business Wire, Sep. 23, 1998.

Chimiak, William H. et al., "Multimedia Collaborative Remote Consultation Tools via Gigabit WAN in Teleradiology," IEEE 13th Annual International Phoenix Conference on Computers and Communications, pp. 417-423, Apr. 12-15, 1994.

Clark, Don, "Keen.com Plans Web Service Allowing Customers to Hold Private Phone Chats," Wall Street Journal, Nov. 8, 1999.

Collett, Stacey et al., "Why Online Browsers Don't Become Buyers," Computerworld, vol. 33, No. 48, p. 14, Nov. 29, 1999.

Davey, Tom, "Wheeling and Dealing Online," PC Week, vol. 13, No. 45, pp. 1, 129, Nov. 11, 1996.

CCBN, Inc. "Full Year 2003 and Q4 Ebookers PLC Earnings Conference Call—Part 2," Fair Disclosure Wire, Mar. 22, 2004.

International Application No. PCT/US01/48284, International Preliminary Examination Report, Aug. 9, 2002.

Rose, D.E. et al., "Understanding User Goals in Web Search," Proceedings of the 13th Int'l Conference on World Wide Web, pp. 13-19, May 17-20, 2004.

* cited by examiner

Choose The Seminar You Would Like To Join:

| Title | Description | Reward | Format | Extras | Joining |
|---|---|---|---|---|---|
| Looking To Buy A Vacation Home? Discuss The Possibilities Here! 510 | Vacation Spots In South Florida And The Caribbean Will Be Discussed. Click Here To Learn More. | 25 Cents Per Minute, Plus $2 For Revealing Your Credit History 512 | One On One | Items Can Be Bought By Pressing #9 | Click Here To Join Seminar 502 |
| World History Encyclopedia Set | Give Your Child A Head Start With This Wonderful Learning Tool. Click Here To Learn More. | 10 Cents Per Minute | One To Many (Unlimited) | Items Can Be Bought By Pressing #9 | Click Here To Join Seminar |
| Auto Stereo Systems | Hear About The Latest In Car Audio Systems- Sony, Alpine, Bose, Toshiba. Click Here To Learn More. | 20 Cents Per Minute | One To Many (Limited To 12 People) | None | Click Here To Join Seminar |
| Exercise System By BodyBlade 506 | Learn About The New Impact-Free Body-Building System From BodyBlade. Click Here To Learn More. | 15 Cents Per Minute, Plus $3 For Revealing Current Owned Equipment 508 | One On One | Items Can Be Bought By Pressing #9 | Click Here To Join Seminar |
| Your Shampoo Preferences | Discuss Your Preferences Regarding Sport Shampoos And Conditioners. Click Here To Learn More. | 15 Cents Per Minute, Plus $2 For Revealing Current Shampoo Brand | One On One | None | Seminar Not In Progress 504 |

Click Here To See More Seminars.    Or, Search For A Seminar According To A Keyword: ___ Go!

Create A Seminar

Create A Seminar Title: Looking To Buy A Vacation Home? Discuss The Possibilities Here!

Create A Seminar Description: Vacation Spots In South Florida And The Caribbean Will Be Discussed. My Name Is Cindy Johnson And I Am A Marketer For Vacation Homes, Inc. My Specialty Is Helping Customers Find The Time-Share Arrangement That Best Suits Their Needs.

Specify The Reward You Are Willing To Offer: 25 Cents Per Minute
(Optional) Plus $2.00 For Revealing Your Credit History.

This Reward Will Be Deducted From Your Credit Card. Add Your Credit Card Number Here: Visa 444-4444-4444-4444

Format:
◉ One On One
○ One To Many, With A Limit Participants

Extras:
◉ Enable Customers To Purchase Items When They Press #9
○ None

[Create Seminar]

FIG. 4

600
Hear Music Like You've Never Heard It Before 
Discuss Our Auto Stereo Systems And Earn 40 Cents Per Minute
 ——————————————————————— 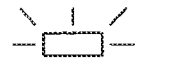
Click Here To
Join Seminar
602
FIG. 5

Register Here To Participate In Paid Seminars

Name: Roger Wilkins

Address: 123 Cherry Lane
Concord, New Hampshire 03104

(This Is Where We Will Send You A Check For The Rewards You Earn)

Telephone Number: 603-555-5555

(This Is Where We Will Call You When You Click "Call Now" To Join A Seminar)

Credit-Card Number: Visa 4444-4444-4444-4444

(We Will Draw Funds From This Credit Card If You Ever Press #9 On Your Telephone Keypad To Purchase An Item. If Have Accrued Enough Rewards In Your Account, We Will Not Draw Funds From This Credit Card.)

[Submit Registration]

FIG. 6

APPARATUS AND METHOD FOR RECRUITING, COMMUNICATING WITH, AND PAYING PARTICIPANTS OF INTERACTIVE ADVERTISING

RELATED APPLICATIONS

The present application is a continuation application of U.S. patent application Ser. No. 10/956,571, filed Oct. 1, 2004 and entitled "Method and System to Connect Consumers to Information," which is a continuation application of U.S. patent application Ser. No. 09/808,475, filed Mar. 13, 2001, and entitled "Apparatus and method for recruiting, communicating with, and paying participants of interactive advertising," the entire disclosures of which applications are hereby incorporated herein by reference.

FIELD OF THE TECHNOLOGY

The invention relates generally to providing users with incentive based interactive advertisements. In particular, the invention relates to a method and apparatus for recruiting, communicating with, and paying participants of interactive advertising.

BACKGROUND

Advertisers seek to connect with their customers in the fullest way possible. Conventionally, this has been done by attempting to make an advertisement, such as a television commercial, humorous or alluring. For an even fuller experience, advertisers will run a commercial, or "infomercial," for an entire half hour, often featuring a celebrity to keep the customer's attention.

No matter how alluring the content or how long the commercial, however, such conventional advertising is severely limited because the customers have no incentive to keep watching except for their own fickle curiosity. In addition, the simple viewing of an advertisement is not an interactive experience between the advertiser and the potential customer. Many advertisers, especially those offering complex products, require a dialogue with their potential customers. They need to have a conversation with their potential customers to find out their immediate needs and answer their questions in order to sell them products.

To solve these limitations and make advertisements more interactive, advertisers have resorted to inviting customers to attend live seminars in person and paying them for their time. Often the payment will take the form of a reward, such as receiving a gas grill for attending a seminar on time-share vacation homes. The customers become "participants," as the advertisers ask them their opinions and questions as they sell them products ranging from encyclopedias to cars.

These live sales seminars achieve the full interactivity that advertisers seek with their customers. The problem with the seminars is all their logistics must be done by hand. Customers must be selected and invited to the seminar. The customers must travel to the location of the seminar. Both the customers and the advertisers must be in the same location at the same, pre-arranged time. The reward to attend the seminar, and the total attendance time required, must be fixed and agreed to beforehand, so that it is worth the trouble of travel. Payment must also be done manually, in accordance to the agreed reward. In summary, holding such live advertising seminars is quite difficult, and in many cases prohibitively expensive, because there is no device for enabling them.

Therefore, there remains a need to overcome one or more limitations in the above described existing art which is satisfied by the inventive structure and method described hereinafter.

SUMMARY OF THE DESCRIPTION

The present invention overcomes the problems in the existing art described above by providing a method and apparatus for recruiting, communicating with, and paying participants of interactive advertising. The present invention is a system through which advertisers can recruit, communicate with, and pay their potential customers for their time. The proposed system achieves all of these functions without the advertiser or the customer having to be in the same location—all logistics are handled through the proposed system's web site, database, and communications interfaces. The proposed system enables advertisers to promote interactive seminars in which they try to sell products to potential customers. Most importantly, the advertisers are able to offer their potential customers financial rewards for their time, such as 25 cents per minute to reward a customer for listening to a sales pitch. The proposed system then provides a real-time communications link between the advertiser and customer. The proposed system automatically bills the advertiser and rewards the customer for the time that they interact.

Advantages of the invention include providing users with the capability to engage in a compensation-based interactive exchange with a provider of a selected advertisement via a real-time communications link. Contrary to current practice, users of the present invention are compensated for interacting with advertisers and engaging in seminars. Consequently, users are compensated and advertisers receive a constant flow of customers for their advertisement in which a user/customer can purchase the product contained in the advertisement.

BRIEF DESCRIPTION OF THE DRAWINGS

The present invention is illustrated by way of example, and not by way of limitation, in the figures of the accompanying drawings and in which:

FIG. 3 depicts a web page illustrating a customer/user interface screen in accordance with an embodiment of the present invention;

FIG. 4 depicts a web page illustrating an advertiser interface screen in accordance with a further embodiment of the present invention;

FIG. 5 is a web page illustrating a banner advertisement screen in accordance with a further embodiment of the present invention;

FIG. 6 is a web page illustrating a customer/user system sign up screen in accordance with a further embodiment of the present invention;

DETAILED DESCRIPTION

The present invention overcomes the problems in the existing art described above by providing a method and apparatus for recruiting, communicating with, and paying participants of interactive advertising. In the following description, for the purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

In an embodiment, the methods of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnetic or optical cards, flash memory, or other type of media/machine-readable medium suitable for storing electronic instructions. Moreover, the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

System Architecture

Figure 1:
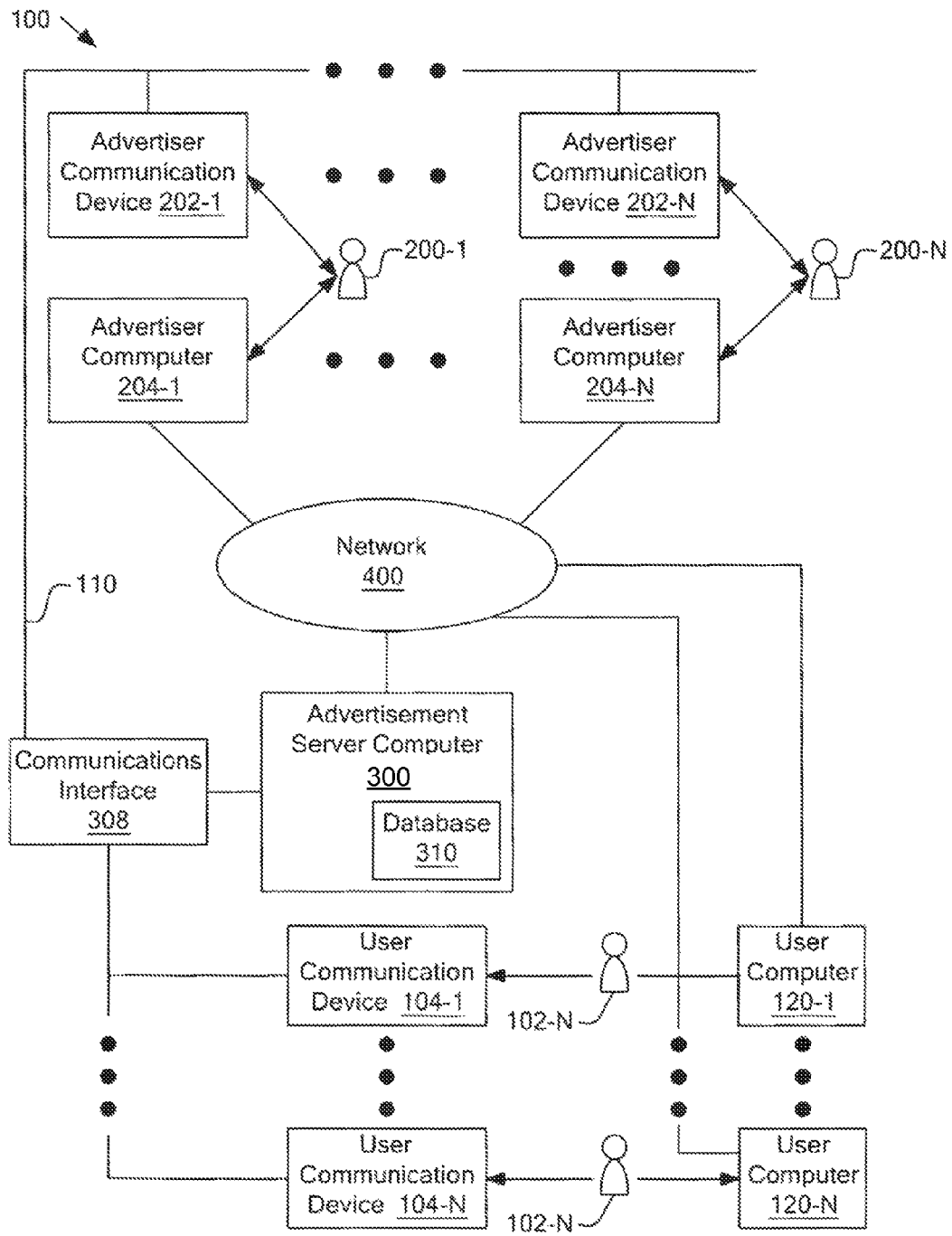
FIG. 1 depicts a block diagram illustrating a system in which an interactive advertisement system in accordance with the present invention may be implemented.

FIG. 1 depicts one embodiment of an interactive advertisement system architecture 100 in which the systems and methods of the present invention may be incorporated. The system 100 includes one or more customer/user computers 120 (120-1, . . . , 120-N) connected through a network 400 (such as an Intranet, an Extranet, a LAN or a WAN such as the Internet) to a host computer or web server ("advertisement server computer"). One or more service provider computers 204 (204-1, . . . , 204-N) e.g., "advertiser computers" are also connected, through the network 400, to the advertisement server computer 300. Persons skilled in the art will recognize that the advertisement server computer 300 may include one or more computers working together to provide the advertisement computer functions described herein. The system 100 further includes one or more advertisers 200 (200-1, . . . , 200-N) each having a communications device 202 (202-1, . . . , 202-N) that is connected to a communications network 110. One or more users 102 (102-1, . . . , 102-N) each also have a communications device 104 (104-1, . . . , 104-N) that is connected to the communications network 110. In accordance with the teachings of the present invention, a user 102 can make a selection for an interactive advertisement link, which is received by the advertisement server computer 300. As described in further detail below, the advertisement server computer 300 can then connect the user 102 to an advertiser 200 of the selected advertisement link for a live conversation.

The communications network 110 generally refers to any type of wire or wireless link enabling the transmission of voice data such as, but not limited to, a public switched telephone network, a wireless communications network, a local area network, a wide area network or a combination of networks. The communications devices 104 and 202 generally refer to any type of device (standard telephones, cellular telephones, satellite telephones or the like) capable of receiving speech from a user and providing the speech to a destination via a communications network, such as the communications network 110. In an embodiment of the present invention, the communications network 110 is a public switched telephone network and the voice transmission medium is a telephone.

Figure 2A:
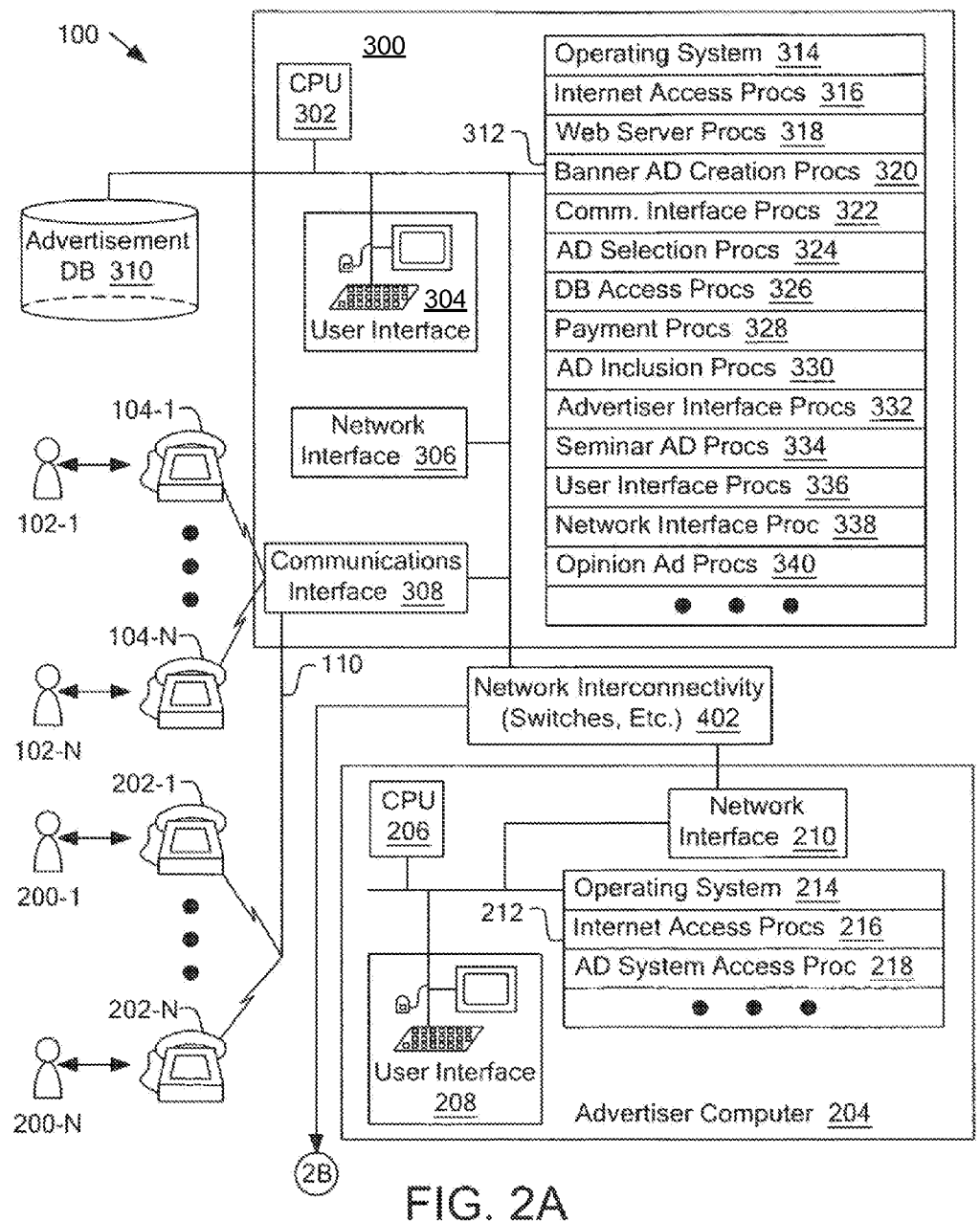
FIGS. 2A and 2B are block diagrams further illustrating the interactive advertisement system as shown in FIG. 1.
Figure 2B:
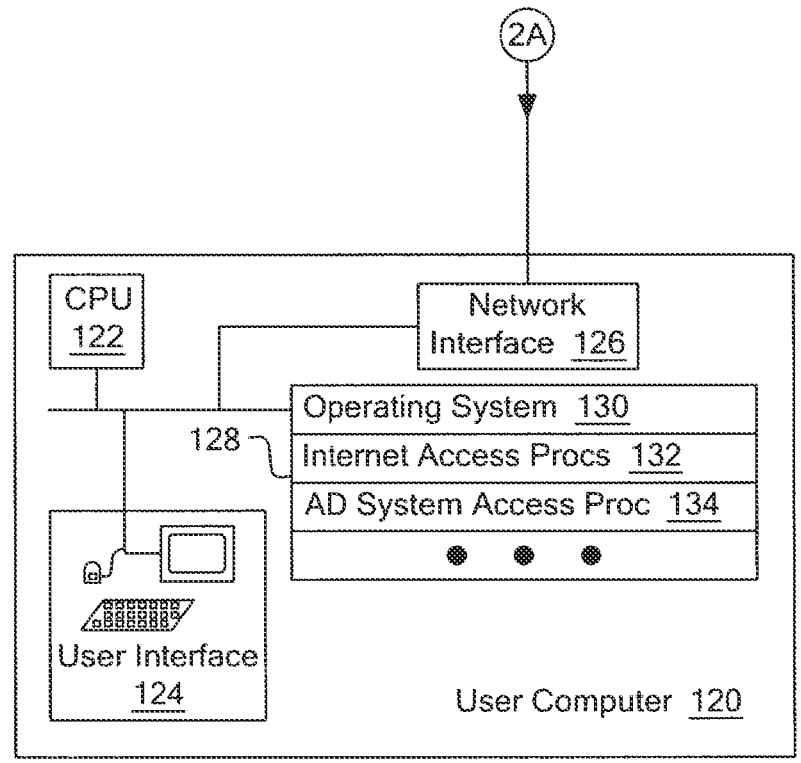

FIGS. 2A and 2B further illustrate the interactive advertisement system 100, including the advertisement server computer 300, as well as the user computer 120 and the service provider computer 204. The advertisement server computer 300 includes a central processing unit (CPU) 302, a user interface 304, a network interface 306, a communications interface 308, a service provider database 310 and a memory 312. The advertisement server computer 300 can be any type of computing device, such as, but not limited to, desktop computers, work stations, lap tops and/or mainframe computers. The communications interface 308 as well as the network interface 306, are used to connect users 102 and advertisers 200, depending on the type of interactive advertisement selected by the user 102. The communications interface 308 connects user communication devices 104 with advertiser communication devices 202 for real-time communication over the communications network 110. The network interface 306 connects user computers 120 and advertiser computers 204 to provide voice over-IP (Internet Protocol) or video over-IP over network 400. The memory 312 of the advertisement server computer 300 may be implemented as RAM (random access memory) or a combination of RAM and nonvolatile memory, such as one or more magnetic disk storage units. The memory can contain any of the following:

an operating system 314;

Internet access procedures 316;

web server procedures 318;

banner advertisement (AD) creation procedures 320 for generating an interactive advertisement link as a banner AD of an advertiser web site, search engine site or the like;

communication interface procedures 322 for connecting a user 102 with an advertiser 200 of a selected advertisement via the user communication device 104 and the advertiser communication device 200 over the communications network 110 for a live conversation;

AD selection procedures 324 for providing the user 102 with a list of fields of advertisement types provided by the interactive advertisement system 100, as well as lists of advertisements matching a type of advertisement selected by the user 102;

database (DB) access procedures 326 for querying the database 310 in order to return records of advertisements matching a type of advertisement selected by the user 102;

payment procedures 328 for compensating the user 102 following interaction with an advertiser 200, as well as billing the advertiser 200 for the interaction and collecting a premium fee for the interactive advertisement system 100;

AD inclusion procedures 330 for providing an on-line interface to advertisers 200 requesting inclusion in the advertisement database 310 in order to acquire perspective customers/users 102 for potential interaction via the interactive advertisement system 100;

advertiser interface procedures 332 for providing both an on-line interface, as well allowing advertisers 200 to update information in the service provider database 310, including times of availability;

seminar AD procedures 334 for providing a real-time communications link between a user computer 120 and an advertiser computer 204 for a live conversation between the user 102 and the advertiser 200 using the network interface procedures 338;

user interface procedures 336 for providing the user 102 with a listing of types of advertisements available from the interactive advertisement system 100, as well as receiving various descriptors for narrowing the search of advertisers, including acceptable payment ranges, specific languages and the like;

network interface procedures 338 for connecting user computers 120 with advertiser computers 204 via a real-time communications link providing, for example, voice over-IP, video over-IP, or the like, for a live conversation between the user 102 and the advertiser 200;

opinion poll AD procedures 340 for providing public opinion poll advertisements at the advertisement system 100 web site or as banner advertisement of various web sites and compensating the user 102 for filling-out an opinion poll questionnaire, which is then transmitted to the advertiser 200 of the opinion poll; and other procedures and files.

FIG. 2B also illustrates the user computer 120, which includes a CPU 122, a user interface 124, a memory 128 and a communications interface 126. The communications interface 126 is used to communicate with the advertisement server computer 300, as well as other system resources not shown. The memory 128 of the user computer 120 may be implemented as RAM (random access memory) or a combination of RAM and non-volatile memory, such as one or more magnetic disk storage units. The memory 128 can contain the following:

an operating system 130;

internet access procedures 132;

voice/video communication procedures 134 for enabling voice over-IP, video over-IP, or like communication between the user 102 and the advertiser 200; and other procedures and files.

FIG. 2A also illustrates the advertiser computer 204, which includes a CPU 206, a user interface 208, a memory 212 and a communications interface 210. The communications interface 210 is used to communicate with the voice portal server computer 300, as well as other system resources not shown. The memory 212 of the advertiser computer 204 may be implemented as RAM (random access memory) or a combination of RAM and non-volatile memory, such as one or more magnetic disk storage units. The memory 212 can contain the following:

an operating system 214;

internet access procedures 216;

voice/video communication procedures 218 for enabling voice over-IP, video over-IP, or like communication between the user 102 and the advertiser 200; and other procedures and files.

The embodiment depicted in FIG. 2A includes an advertisement database 310 containing information about a wide array of advertisements and their advertisers 200. In order to recruit, communicate with, and pay their potential customers for their time, advertisers 200 list themselves, as well as their advertisement, in this database 310. In one embodiment, this is done through the use of an Internet web site, via an advertiser interface screen 550, as depicted in FIG. 4. The advertiser 200 registers his/her name, phone number, e-mail address and network address using the advertiser interface screen 550, along with a description of the advertisement that he/she offers. Possible examples of the wide array of fields of advertisement types available from the interactive advertisement system 100 include, but are not limited to, the advertisement product types depicted in FIG. 3, such as seminars, opinion polls and the like. The description includes key words describing the field of service. The description also includes a price paid to the user 102 for feedback provider to the advertiser, most commonly, but not restricted to a per-minute price.

Referring now to FIG. 3, the current invention provides a system through which an advertiser can execute all of the functions of a paid interactive sales seminar with their customers. The system enables the advertiser to hold this paid interactive seminar remotely, via the Internet, without having to bring people together in person. For example, a customer 102 can go to a web site customer interface screen 500 and view the titles of a wide array of interactive seminars that are taking place at any given time. The advertiser can use a control interface (not shown) to turn a seminar "on" or "off". When the seminar is turned "on", the customer's view shows a "Join Seminar" button 502. When a seminar is turned "off", it disappears from the customer's view, or it displays the future time when the seminar will take place 504.

The advertiser 200 can control the reward that is offered to the customer 102 to take part in the seminar. The reward could be per-minute, such as $0.50 per minute, such that if the customer took part for ten minutes, the customer would be paid $5.00. The reward could also be a flat amount, such as $10.00 or various other forms of payment. It could also be contingent on information that the customer 102 would provide during the seminar.

As depicted in FIG. 3, the customer 102 can view all of the interactive seminars that are currently turned "on" and can view a description of each one as well as the reward offered. For instance, a customer 102 could compare the description of a seminar 506 that is advertising exercise machines for a 25-cents-per-minute reward 508 versus one that is advertising vacation homes 510 for a 30-cents-per-minute reward 512. In each case, the customer could read about the products that will be advertised. Once the customer 102 decides which seminar to take part in, the customer 102 presses the "Join Seminar" button 502 which initiates a real-time communications link between the advertiser and the customer.

In one embodiment, this communications link will be in the form of a telephone call. The system 100 will call the customer 102 via the telephone 104 using communication interface 308 and the communication interface procedures 322. Upon the customer 102 accepting the call, the system 100 will place a separate telephone call to the advertiser 300. Upon the advertiser 200 accepting the call, the system 100 will conference together the two telephone calls, thereby connecting the advertiser 200 and customer via a real-time voice communications link 110. In this embodiment, since the system 100 initiates both telephone calls, the anonymity of both parties is preserved—neither party has knowledge of the other's telephone number. This embodiment also enables the system 100 to keep track of the time that the advertiser 200 and customer 102 spend communicating.

In one embodiment, the time the advertiser 200 spends communicating with the customer becomes the basis for rewarding the customer in accordance with the payment procedures 328. For instance, if the seminar has a 25-cents-per-minute reward, and the advertiser 200 and customer 102 speak on the telephone for 10 minutes, the system will automatically bill the advertiser $2.50 and credit the customer $2.50. The system can also collect a commission for maintaining the service, such as a 10% commission.

Alternatively, the communications link could be in the form of voiceover-IP, using the network interface 306 and network interface procedures 338. As such, the advertiser 200 and customer 102 can speak directly through their computers, 102 and 204 or handheld "personal digital assistants", over the Internet 400. The communications link could be in the form of a toll-free 1-800 phone call. For example, the customer would choose a seminar that is in session, then dial 1-800-SEMINAR and enter the seminar's specific extension, such as #4586, to connect to the desired seminar. The communications link could be in the form of a video connection, video-over-IP or otherwise, such that the advertiser 200 and customer 102 could see a real-time video conferencing image of the other party. Alternatively, the communications link could enable the customer to listen or view recorded information that the advertiser has prepared. Many customers could access this recorded information at the same time. The customer who listens to recorded information could upgrade the connection to a live presentation if the information is of interest. Using voice or video over-IP, a sales seminar could be a one-on-one communication between the advertiser 200 and the customer 102 or a one-to-many communication between the advertiser 200 and many customers 102.

For instance, an advertiser could present the benefits of buying a vacation home to 100 people who have clicked on "Join Seminar" and are in a realtime communication for 10 cents per minute with the advertiser 200. Additionally, the sales seminar could be limited to a certain number of customers. For instance, when the maximum number of 10 customers are in contact with the advertiser, the seminar is turned "off" to further customers and the "Join Seminar" button no longer appears. Finally, extra rewards could be offered for input from the customers. For instance, if a customer tells a story about what his ideal vacation home would be like, he or she might receive an additional dollar or an increased per-minute reward.

In a further embodiment, the advertiser 200 can choose to uninvite a customer 102 from a seminar in progress. For instance, if the advertiser feels that one of the customers is not interested or is collecting money without offering satisfactory input, the advertiser could use the system's control interface to select a customer and remove him or her from the seminar, thereby halting the monetary reward to that customer. Likewise, the customer can move from one seminar to the next. The customer could "shop" one advertiser after the other, hearing a variety of advertising messages and collecting many different rewards for doing so.

In a further embodiment, the customer 102 could not only use the system to hear the sales seminar, but he or she could also buy the product through the system 100. For instance, after listening to the advertiser 200 describe a set of encyclopedias via the telephone 104 for 25 cents per minute, the customer 102 could press "9" on the telephone's touch-tone keypad, which would trigger a purchase. The price of the encyclopedias would be automatically deducted from the customer's balance, and the encyclopedias would be sent to the customer 102. In such a case, the price the customer 102 paid could be deducted from the rewards the customer 102 had earned thus far from taking part in the seminar. As the customer accrues rewards by attending seminars, and, when the customer has accrued a significant amount, such as $25, the system 100 would issue his or her check in the mail. Otherwise, the customer accrues rewards by attending seminars, and the rewards are automatically transferred in the form of digital cash from the advertiser to the customer as the seminar is in progress.

Referring now to FIG. 5, an embodiment is depicted wherein the customer 100 does not come to a central online marketplace to view the possible seminars that can be attended. Instead the advertiser 208 sends targeted invitations to customers 102. For example, at a newspaper web site, the customer 102 is shown a banner advertisement 600 that offers 40 cents per minute to listen to a seminar about auto stereo systems. The customer clicks on the advertisement 602, which triggers the real-time communications connection between the advertiser 200 and customer 102 through, for example, the telephone 202 and 104. During the call, 40 cents per minute is automatically transferred from the advertiser 200 to the customer 102 as the seminar takes place. Alternatively, the reward to take part in the seminar would not be paid by the advertiser 200 to the customer 102, but rather by the customer 102 to the advertiser 200. For example, if the goods being advertised were in extremely high demand, the advertiser 200 could charge customers 102 a per-minute fee to take part in the sales seminar. Procedural methods for implementing the teachings of the present invention are now described.

Operation

Figure 7:
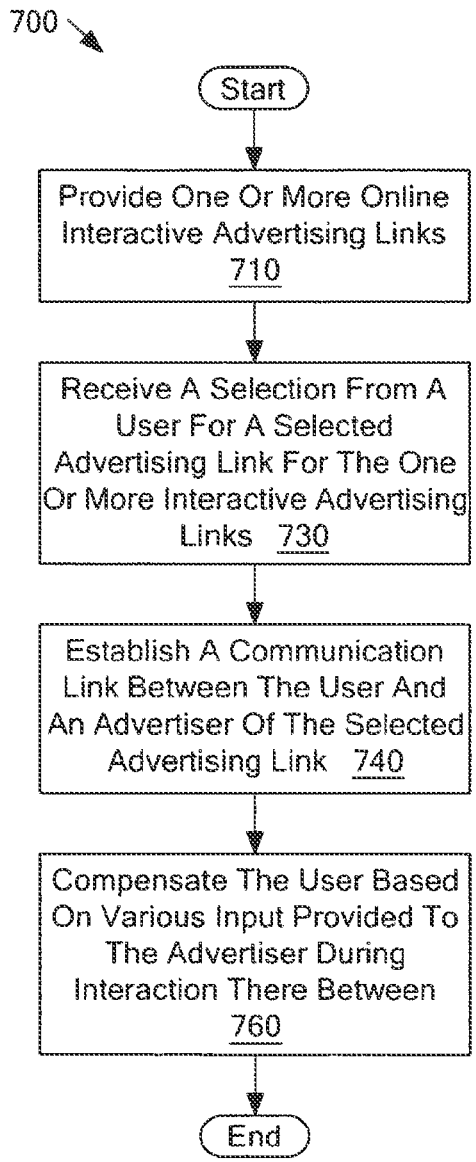
FIG. 7 is a flow chart illustrating a method for enabling an advertiser to recruit, communicate with and pay participants of interactive advertising in accordance with an embodiment of the present invention.

Referring now to FIG. 7, a method 700 is depicted for enabling an advertiser 200 of an interactive advertisement link to recruit, communicate with and pay a participant 102 of an interactive advertisement, for example, in the interactive advertisement system 100, as depicted in FIGS. 1, 2A and 2B. At step 710, the system 100 provides one or more online interactive advertising links as depicted in FIG. 4. At step 730, the system 100 receives a selection from a user 102 for a selected advertisement link listed among the one or more interactive advertising links. At step 740, the system 100 establishes a communication link between the user 102 and an advertiser 200 of the selected advertising link.

As described above, the communications link between the user 102 and the advertiser includes live interaction via the user communication device 104 and the advertiser communication device 202 or via the user computer 120 and the advertiser computer 204. The user communication device 104, as well as the advertiser communication device 202, include but are not limited to land-line telephones, wireless cellular telephones, satellite telephones or the like, which communicate over the communications network 110. Communication via the user computer 120 and the advertiser computer 204 include real-time communication, including but not limited to voice over-IP or video over-IP, or the like. However, those skilled in the art will appreciate that other means of communication, such as non-real-time communication, required for filling out public opinion polls, or for providing recorded advertisements, are included within the scope of the invention. At step 760, the system 100 compensates the user 102 based on various input provided to the advertiser 200 during interaction there between. The compensation may come in the form of a time-based fee paid to the user 102 or a flat fee paid by the advertiser 200.

Figure 8:
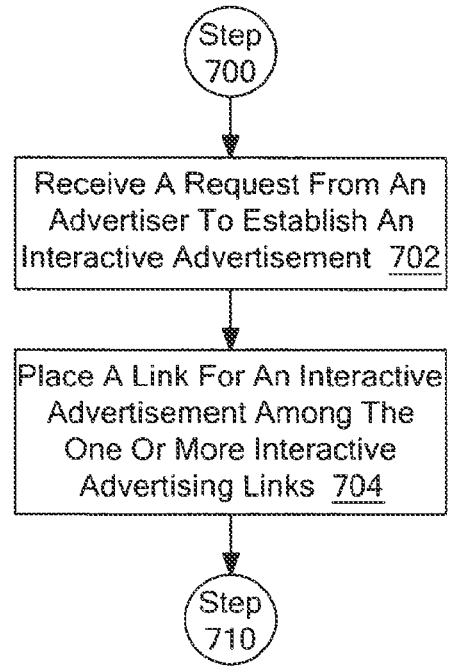
FIG. 8 is a flow chart illustrating an additional method for adding an interactive advertising link to the interactive advertisement system in accordance with a further embodiment of the present invention.

FIG. 8 depicts an additional method for placing an interactive advertisement link on a customer interface screen 500 of the interactive advertisement system 100, as depicted in FIG. 3. At step 702, the system 100 receives a request from an advertiser to establish an interactive advertisement link via the advertiser interface screen 550, as depicted at FIG. 4. At step 704, the system 100 places a link for an interactive advertisement among the one or more interactive advertisement links.

Figure 9:
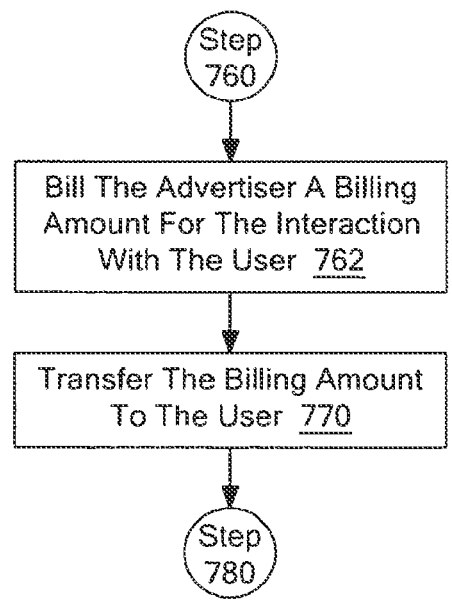
FIG. 9 depicts an additional method for billing an advertiser for interaction with a customer in accordance with a further embodiment of the present invention.

FIG. 9 depicts an additional method for performing the user compensation step 760, as depicted in FIG. 7. At step 762, the system 100 bills the advertiser 200 a billing amount for the interaction with the user. At step 770, the system 100 transfers the billing amount to the user 102. As described above, the billing amount includes but is not limited to a time-based fee or a flat fee. However, first time users of the interactive advertisement system 100 fill out a customer registration screen 650 prior to participations as depicted in FIG. 6. Alternatively, an advertiser may provide a product with very limited public availability, for example, limited edition products or hard to find items, due to great consumer demand. As such, the user could be charged by the advertiser for the ability to purchase the highly desired product.

Figures 10, 11:
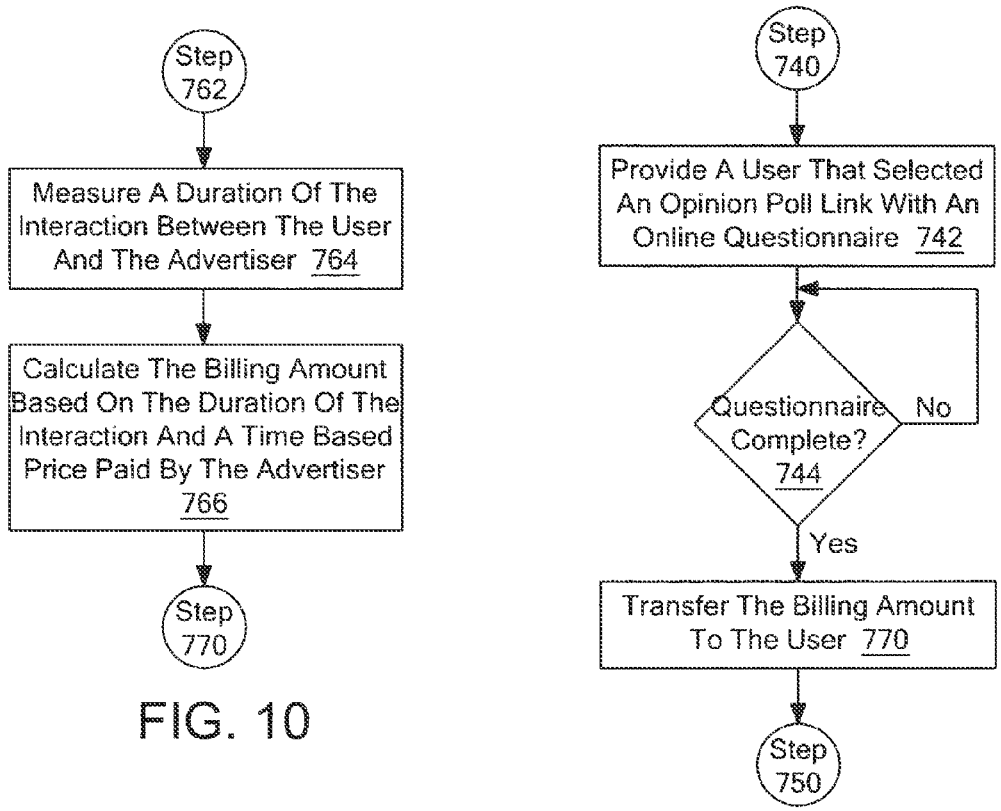
FIG. 10 is a flow chart depicting an additional method for compensating a user that has participated in an interactive advertisement.
FIG. 11 depicts an additional method for providing a public opinion poll as an interactive advertisement in accordance with a further embodiment of the present invention.

Referring now to FIG. 10, FIG. 10 depicts an additional method for performing the advertiser billing step 762, as depicted in FIG. 9. At step 764, the system 100 measures a duration of the interaction between the user 102 and the advertiser 200. At step 766, the system 100 calculates the billing amount based on the payment procedures 328. For example, the billing amount may be based on the duration of the interaction between the user 102 and the advertiser 200 and a time-based price paid by the advertiser.

Referring now to FIG. 11, FIG. 11 depicts an additional method required for selection of an interactive opinion poll advertisement link. At step 742, the system 100 provides a user 102 that selected an opinion poll link with an online questionnaire. Once the user has completed the questionnaire at step 744, the system 110 transmits the completed questionnaire to an advertiser 200 of the opinion poll at step 746 using the opinion AD procedures 340. Although these method steps describe the interactive opinion poll as requiring the filling out of a questionnaire by the user 102, those skilled in the art will appreciate that a real-time communications link may be established between the user 102 and an advertiser 200 of the public opinion poll to provide live interaction, either via the communications devices 202 and 104 or over the computers 120 and 204 in order to provide a real-time interaction between the user 102 and the advertiser 200.

Figure 12:
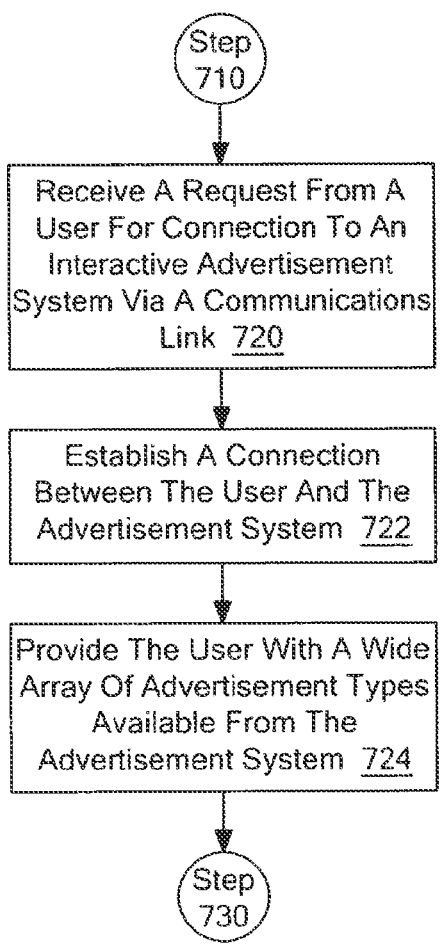
FIG. 12 is a flow chart illustrating a method for establishing a connection between the interactive advertisement system and a user in accordance with a further embodiment of the present invention.

FIG. 12 depicts a method for establishing a connection between a user 102 and the interactive advertisement system 100. At step 720, the system 100 receives a request from a user 102 for connection to the interactive advertisement system 100 via a communications link. The communications link will generally be over the network 400 connected to the user computer 120. However, those skilled in the art will appreciate that the user may establish a connection with the interactive advertisement system 100 via the user communication device 104. Consequently, the advertisement system could process voice commands via the communications interface 308 in order to connect the user 102 with an advertiser of a selected advertisement link. This connection enables a live interaction via the communications network 110 and compensates the user 102 for participation in the interactive advertisement. At step 722, the system 100 establishes a connection between the user 102 and the advertisement system 100. Finally, at step 724, the system 100 provides the user with a wide array of advertisement types available from the advertisement system. The various advertisement types available from the advertisement system include, but are not limited to, product advertisements, opinion polls, product seminars and the like as depicted in FIG. 3.

Figure 13:
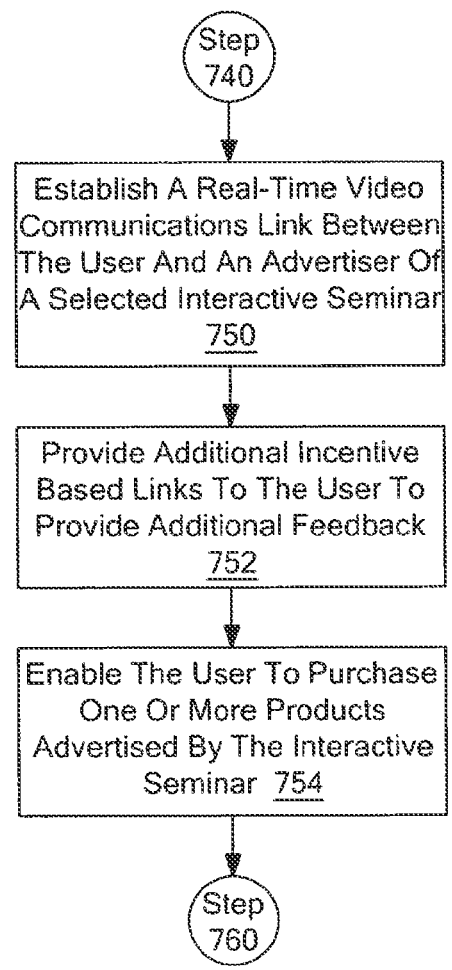
FIG. 13 depicts an additional method for establishing a communications link between a user and an advertiser of a selected advertising link in accordance with a further embodiment of the present invention.

Referring now to FIG. 13, FIG. 13 depicts an additional method for establishing the real-time communications connection of step 740, as depicted in FIG. 7. At step 750, a real-time video communications link between one or more users 102 and an advertiser 200 of a selected interactive seminar is established by the system 100. As such, the system 100 enables the advertiser to hold a paid interactive seminar remotely via the Internet without having to bring people together in person. At step 752, the system 100 provides additional incentive-based links to the one or more users to provide additional feedback. Such additional incentives include, for example, providing credit descriptions or additional personal information which users might be reluctant to initially divulge. Finally, at step 754, the system 110 enables the user to purchase one or more products advertised by the interactive seminar.

Figure 14:
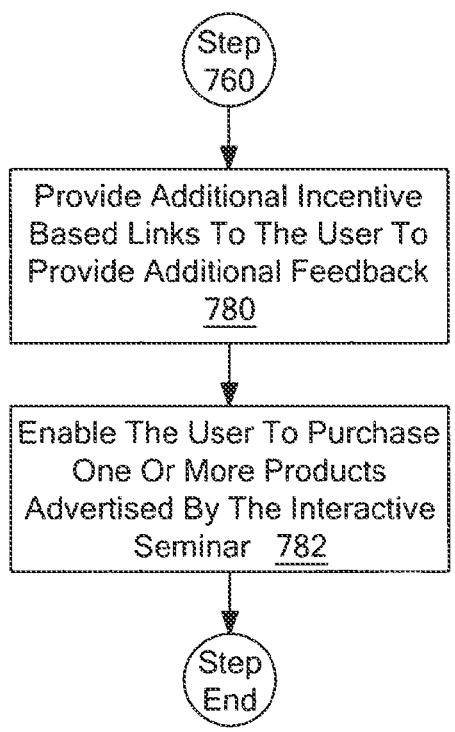
FIG. 14 depicts a flow chart illustrating an additional method for providing additional incentives to users, as well as enabling users to purchase products described in the interactive advertisement in accordance with a further embodiment of the present invention.

Finally, FIG. 14 depicts a method for providing additional incentives and product purchase options to the user 102 such as described with reference to the flow chart illustrated in FIG. 13. As such, at step 780, the system provides additional incentive-based links to the user to provide additional feedback. At step 782, the system 100 enables the user to purchase one or more products advertised by the interactive advertisement. As such, additional incentives can be provided in regular product advertisements and the user is enabled to purchase products in each type of advertisement.

Application of the Invention

Cindy is a marketer for a company that sells vacation homes. She does most of her business selling not entire vacation homes, but rather selling time-shares. In other words, her clients buy the right to stay in a vacation home for certain periods of time during the year. Other clients buy the right to stay in the same vacation home for different periods of time during the year. Because she has a variety of vacation homes to offer and each one can possibly be time-shared among many different clients, Cindy needs to have a thorough dialogue with her customers. She needs to thoroughly understand their desires: in what location they would like to have a vacation home, what kind of house should it be, would they be willing to share it with other customers in a time-share arrangement, and during which time periods of the year would they want to do so.

Because Cindy needs to have a thorough interactive dialogue with her potential customers, she uses the proposed system to interact with her customers and reward them for hearing her sales pitch. At the online marketplace of the proposed system, Cindy has created a seminar title: "Looking to buy a vacation home? Discuss the possibilities here!" She has also specified a fee of 25 cents per minute that rewards potential customers for listening to her sales pitch. She is also offering an additional $2 reward for potential customers who are willing to reveal their credit history during the session. In order to pay these rewards, Cindy enters her credit card number at the web site of the proposed system so she can be charged for the time that potential clients speak with her. Because Cindy needs to speak in depth with each potential customer, she limits this seminar to one potential customer at a time.

Whenever Cindy is ready to interact with potential customers, she uses the control interface of the proposed system to turn her seminar "on." At the online marketplace of the proposed system, this makes a "Join Seminar" button appear next to her seminar title, welcoming potential customers to talk to her.

Roger is a frequent traveler who enjoys vacation trips. Having gone on several trips and travel cruises, he receives an enormous amount of promotional material in the mail and many unsolicited telemarketing phone calls. Roger, however, is not willing to spend his free time listening to the sales pitches of travel companies. Instead, he believes that advertisers should pay him for his time when they pitch him their offers. He therefore does much of his shopping at the web site of the proposed system. There, he can examine a large array of offers that advertisers are willing to pay him to see. There are paid seminars on exercise equipment, paid seminars on cookware, even paid seminars that require a special invitation to take part in.

Since he is interested in vacationing, Roger goes to the area of the web site that deals with vacations. There, he sees the titles of many seminars that he can join at the present time. Next to each title, he can see the per-minute reward that he would receive if he takes part in the seminar. He sees a seminar that interests him: "Looking to buy a vacation home? Discuss the possibilities here!" He reads a brief text description of the vacation homes that will be discussed in the seminar. Next to the description is the per-minute reward: the advertiser (Cindy) is offering him a reward of 25 cents per minute to take part in the seminar.

Since he would like to take part in the seminar, Roger presses the "Join Seminar" button. The web site then asks him for his telephone number so that he can join the seminar. After he enters it, the proposed system calls him on the telephone. The proposed system then calls the advertiser of this seminar, Cindy, on the telephone. The two parties are then conferenced together. They are informed that Roger will receive 20 cents per minute from Cindy for the duration of this call.

Roger and Cindy speak in depth about vacation homes. Cindy asks him all about his vacationing needs, and Roger explains his likes and dislikes, as well as his price range. With this information in mind, Cindy describes a time-share arrangement in which Roger could pay a relatively small amount to enjoy a vacation home for one week in Florida. This sounds like a good option to Roger.

Cindy feels that she is close to a sale with Roger, but would feel better if she would know his credit history. She therefore tells him that she is offering a $2 reward if he reveals his credit history to her. Roger does so, providing the necessary information, and Cindy presses the number "5" on her telephone keypad, which instructs the proposed system to transfer an additional $2 reward from her account into Roger's.

Cindy is satisfied with her customer Roger, and Roger would like to purchase the one-week time-share that she had recommended. He therefore presses the number "9" on his telephone keypad, which instructs the proposed system that he would like to initiate a purchase. As a supplemental feature, the proposed system then uses a series of telephony prompts to lead Roger through the steps of a purchase. Cindy and Roger then hang up their telephones. They talked for a total of twenty minutes.

The proposed system then automatically does the accounting for what occurred. Since Cindy and Roger talked for twenty minutes, Roger earned a reward of 20 minutes multiplied times 25 cents per minute, which equals $5. The proposed system transfers $5 from Cindy's account to Roger's, minus a 10% fee that is collected by the system. The proposed system also transfers the extra $2 from Cindy's account to Roger's to compensate him for revealing his credit history. As a supplemental feature, the proposed system also transfers the price of Roger's purchase from his account into Cindy's.

After this interaction, Roger continues to "shop" different seminars and earn money for doing so. Some of them are one-to-one seminars, such as Cindy's. Others are one-to-many, where Roger is one of many customers listening to a sales pitch. Some seminars are for invitees only. After Roger attends many seminars, he accrues $40 in his account at the proposed system. At the end of the month, the proposed system sends him a check in the mail.

Alternate Embodiments

The foregoing description, for purposes of explanation, used specific nomenclature to provide a thorough understanding of the invention. However, it will be apparent to one skilled in the art that the specific details are not required in order to practice the invention. In other instances, well known components and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

Further, the method and system described hereinabove is amenable for execution on various types of executable mediums other than a memory device such as a random access memory. Other types of executable mediums can be used, such as but not limited to, a computer readable storage medium which can be any memory device, compact disc, or floppy disk.

Although the present invention has been described with reference to an incentive-based interactive advertisement system, it is not limited to providing advertisements over the Internet. The present invention can be used for other electronic commerce purposes, other commodities, other types of provider, and other types of services not explicitly listed. In addition, voice and video transmission mediums within the contemplation of the present invention include systems for wireless communications or any network capable of transmitting voice data, voice and video-over-IP, or the like. Moreover, performance, by a human operator, of the interactive voice recognition procedures of the present invention is within the contemplation of the present invention.

Advantages of the invention include providing users with the capability to engage in a compensation-based interactive exchange with a provider of a selected advertisement via a real-time communications link. Contrary to current practice, users of the current system are compensated for interacting with advertisers and engaging in seminars. Consequently, users are compensated and advertisers receive a constant flow of customers for their advertisement in which a user/customer can purchase the product contained in the advertisement.

Having disclosed exemplary embodiments and the best mode, modifications and variations may be made to the disclosed embodiments while remaining within the scope of the invention as defined by the following claims.

What is claimed is:

1. A method, comprising:
   providing, by a first party to a customer, an advertisement on behalf of an advertiser to advertise an interactive marketing session, the advertisement configured to identify
      at least a reference to a telephonic connection with the advertiser for the customer to join the interactive marketing session, wherein the telephonic connection permits voice communications between the customer and the advertiser, and
      a price to reward the customer for the voice communications with the advertiser in the interactive marketing session;
   registering, by the first party, the customer to allow the customer to
      use the reference to request the telephonic connection with the advertiser to join the interactive marketing session, and
      earn rewards from the interactive marketing session;
   connecting, by the first party, the customer to the advertiser for the interactive marketing session over the telephonic connection;
   charging, by the first party, a fee according to the price, specified by the advertiser to reward the customer, after the telephonic connection for the interactive marketing session is established via the reference between the advertiser and the customer; and
   rewarding, by the first party, the customer according to the price for voice communications with the advertiser in the interactive marketing session over the telephonic connection established via the reference.

2. The method of claim 1, wherein the advertisement is placed on a media channel.

3. The method of claim 2, wherein the media channel is an Internet.

4. The method of claim 1, wherein the first party providing the advertisement includes providing a reference to be selected by a customer to initiate a telephone call to the advertiser.

5. The method of claim 4, wherein the reference includes a hyper-link to be selected by a customer to initiate a telephone call to the advertiser.

6. The method of claim 1, further including
   providing, by the first party, advertisements on a media channel on behalf of multiple advertisers, the advertisements to include at least a reference to a telephonic connection with the respective advertisers; and
   billing, by the first party, the respective advertisers in response to a telephonic connection being established between the respective advertiser and a customer.

7. The method of claim 4, wherein the first party providing the advertisement includes providing a reference to be selected by a customer to initiate a voice-over IP telephone call to the advertiser.

8. The method of claim 1, wherein the advertisement is provided in response to a search performed by a consumer.

9. The method of claim 8, wherein the advertisement is provided in response to a search performed by a consumer for geographic location.

10. The method of claim 8, wherein the advertisement is provided in response to a search performed by a consumer for a subject matter.

11. The method of claim 8, wherein the advertisement is provided in response to a key word search performed by a consumer.

12. A system, comprising:
   at least one processor; and
   memory storing instructions configured to instruct the at least one processor to at least:
      provide to a customer an advertisement on behalf of an advertiser to advertise an interactive marketing session, the advertisement configured to identify at least
         a reference to a telephonic connection with the advertiser for the customer to join the interactive marketing session, wherein the telephonic connection permits voice communications between the customer and the advertiser, and
         a price to reward the customer for the voice communications with the advertiser in the interactive marketing session;
      register the customer to allow the customer to
         use the reference to request the telephonic connection with the advertiser to join the interactive marketing session, and
         earn rewards from the interactive marketing session;
      connect the customer to the advertiser for the interactive marketing session over the telephonic connection;
      charge a fee according to the price, specified by the advertiser to reward the customer, after the telephonic connection for the interactive marketing session is established via the reference between the advertiser and the customer; and
      reward the customer according to the price for voice communications with the advertiser in the interactive marketing over the telephonic connection established via the reference.

13. A non-transitory machine-readable medium having stored thereon a set of instructions configured to instruct a computing apparatus to perform at least:
   providing, by the computing apparatus to a customer, an advertisement on behalf of an advertiser to advertise an interactive marketing session, the advertisement configured to identify at least
      a reference to a telephonic connection with the advertiser for the customer to join the interactive marketing session, wherein the telephonic connection permits voice communications between the customer and the advertiser, and
      a price to reward the customer for the voice communications with the advertiser in the interactive marketing session;
   registering, by the computing apparatus, the customer to allow the customer to use the reference to request the telephonic connection with the advertiser to join the interactive marketing session, and earn rewards from the interactive marketing session;

connecting, by the computing apparatus, the customer to the advertiser for the interactive marketing session over the telephonic connection;

charging, by the computing apparatus, a fee according to the price, specified by the advertiser to reward the customer, after the telephonic connection for the interactive marketing session is established via the reference between the advertiser and the customer; and rewarding, by the computing apparatus, the customer according to the price for voice communications with the advertiser in the interactive marketing over the telephonic connection established via the reference.

14. The method of claim 1, wherein the price is specified by the advertiser.

15. The method of claim 4, wherein the price is based on a duration of the telephonic connection between the advertiser and the customer.

16. The method of claim 1, further comprising:

charging, by the first party, the customer on behalf of the advertiser for a purchase made by the customer, from the advertiser, over the telephonic connection between the advertiser and the customer;

wherein the advertisement further includes an instruction to the customer on how to purchase an item over the telephonic connection.

17. The method of claim 1, wherein the fee comprises an advertisement fee.

18. The method of claim 1, further comprising:

rewarding the customer in response to input requested by the advertiser and received from the customer over the telephonic connection between the advertiser and the customer.

19. The method of claim 1, wherein the advertisement indicates whether the interactive marketing session is currently in progress.

* * * * *